US010964940B1

(12) United States Patent
Mason et al.

(10) Patent No.: US 10,964,940 B1
(45) Date of Patent: Mar. 30, 2021

(54) ELECTROACTIVE MATERIALS FOR METAL-ION BATTERIES

(71) Applicant: Nexeon Limited, Abingdon (GB)

(72) Inventors: Charles Mason, Abingdon (GB); Richard Taylor, Abingdon (GB); Christopher Michael Friend, Abingdon (GB)

(73) Assignee: Nexeon Limited, Abingdon (GB)

(*) Notice: Subject to any disclaimer, the term of this patent is extended or adjusted under 35 U.S.C. 154(b) by 0 days.

(21) Appl. No.: 17/024,383

(22) Filed: Sep. 17, 2020

(51) Int. Cl.
| | |
|---|---|
| *H01M 4/36* | (2006.01) |
| *H01M 4/04* | (2006.01) |
| *H01M 4/133* | (2010.01) |
| *H01M 4/38* | (2006.01) |
| *H01M 10/0525* | (2010.01) |
| *H01M 4/1393* | (2010.01) |
| *H01M 4/02* | (2006.01) |
| *H01M 4/62* | (2006.01) |

(52) U.S. Cl.
CPC ......... *H01M 4/366* (2013.01); *H01M 4/0428* (2013.01); *H01M 4/133* (2013.01); *H01M 4/1393* (2013.01); *H01M 4/362* (2013.01); *H01M 4/38* (2013.01); *H01M 4/386* (2013.01); *H01M 4/625* (2013.01); *H01M 10/0525* (2013.01); *H01M 2004/027* (2013.01)

(58) Field of Classification Search
CPC ...... H01M 4/366; H01M 4/362; H01M 4/386; H01M 4/625; H01M 4/1393; H01M 4/133
See application file for complete search history.

(56) References Cited

U.S. PATENT DOCUMENTS

| | | |
|---|---|---|
| 5,624,606 A | 4/1997 | Wilson et al. |
| 5,798,137 A | 8/1998 | Lord et al. |
| 7,361,431 B2 | 4/2008 | Kim et al. |
| 7,722,991 B2 | 5/2010 | Zhang et al. |
| 8,057,900 B2 | 11/2011 | Luhrs et al. |
| 8,361,659 B2 | 1/2013 | Richard |
| 8,562,869 B2 | 10/2013 | Mah et al. |
| 8,673,502 B2 | 3/2014 | Petrat et al. |
| 8,778,541 B2 | 7/2014 | Yamamoto et al. |
| 8,906,555 B2 | 12/2014 | Hwang et al. |
| 8,926,932 B2 | 1/2015 | Pfeifer et al. |
| 8,945,431 B2 | 2/2015 | Schulz et al. |
| 9,039,939 B2 | 5/2015 | Sano |
| 9,373,838 B2 | 6/2016 | Yushin et al. |
| 9,517,445 B2 | 12/2016 | Romanos et al. |
| 9,593,413 B2 | 3/2017 | Amine et al. |
| 9,876,221 B2 | 1/2018 | Kim et al. |
| 9,997,784 B2 | 6/2018 | Su et al. |
| 10,000,425 B2 | 6/2018 | Le Costaouec et al. |
| 10,128,490 B2 | 11/2018 | Lee et al. |
| 10,147,950 B2 | 12/2018 | Sakshaug et al. |
| 10,170,753 B2 | 1/2019 | Ren et al. |
| 10,424,786 B1 | 9/2019 | Mason |
| 10,508,335 B1 | 12/2019 | Yilmaz et al. |
| 10,658,659 B1 | 5/2020 | Mason |
| 2006/0057355 A1 | 3/2006 | Suzuki et al. |
| 2011/0309310 A1 | 12/2011 | Koller et al. |
| 2012/0156493 A1 | 6/2012 | Maisels |
| 2012/0264020 A1 | 10/2012 | Burton et al. |
| 2013/0209348 A1 | 8/2013 | Ludvik |
| 2013/0280601 A1 | 10/2013 | Geramila |
| 2013/0344391 A1 | 12/2013 | Yushin et al. |
| 2014/0057179 A1 | 2/2014 | Yushin et al. |
| 2014/0272592 A1 | 9/2014 | Thompskins |
| 2015/0321920 A1 | 11/2015 | Geramila |
| 2016/0104882 A1 | 4/2016 | Yushin et al. |
| 2016/0298234 A1 | 10/2016 | Yang |
| 2016/0351894 A1 | 12/2016 | Wagner et al. |
| 2017/0092950 A1 | 3/2017 | Xiao et al. |
| 2017/0170477 A1* | 6/2017 | Sakshaug .............. H01M 4/364 |
| 2017/0301917 A1 | 10/2017 | Yuge |
| 2017/0346084 A1 | 11/2017 | Sakshaug et al. |
| 2018/0151884 A1 | 5/2018 | Yushin et al. |
| 2018/0277853 A1 | 9/2018 | Mitlin et al. |
| 2018/0331356 A1 | 11/2018 | Feaver |
| 2018/0342732 A1 | 11/2018 | Troegel et al. |
| 2019/0001299 A1 | 1/2019 | Sturm et al. |

(Continued)

FOREIGN PATENT DOCUMENTS

| | | |
|---|---|---|
| CN | 102456876 A | 5/2012 |
| CN | 102214817 A | 10/2012 |

(Continued)

OTHER PUBLICATIONS

Bardet et al., "In situ investigation of mesoporous silicon oxidation kinetics using infrared emittance spectroscopy," Phys. Chem. Chem. Phys., 18, 18201-308 (2016).
Cadoret et al., "Silicon Chemical Vapor Deposition on macro and submicron powders in a fluidized bed," Powder Technology, 190(102), 185-91 (2009).
Coppey et al., "Decorated carbon nanotubes by silicon deposition in fluidized bed for Li-ion battery anodes," Chem. Eng. Res. Des. 91, 2491-96 (2013).
Curdts et al., "Upscaling the chemical vapour infiltration process of activated carbon with TMS," Physics Procdia, 46, 248-54 (2013).
Wilson et al., "Lithium Insertion in Carbons Conatining Nanodispersed Silicon," J. Electrochem. Soc., 142(2), 326-332 (1995).
Delhaes, "Chemical vapor deposition and infiltration processes of carbon materials," Carbon, 40, 641-657, (2002).

(Continued)

*Primary Examiner* — Ladan Mohaddes
(74) *Attorney, Agent, or Firm* — McDonnell Boehnen Hulbert & Berghoff LLP

(57) ABSTRACT

This invention relates to particulate electroactive materials consisting of a plurality of composite particles, wherein the composite particles comprise: (a) a porous carbon framework including micropores and mesopores having a total volume of 0.5 to 1.5 $cm^3/g$; and (b) silicon located at least within the micropores of the porous carbon framework in a defined amount relative to the volume of the micropores and mesopores. At least 20 wt % of the silicon is characterized as surface silicon by thermogravimetric analysis.

26 Claims, 2 Drawing Sheets

(56) References Cited

U.S. PATENT DOCUMENTS

| | | |
|---|---|---|
| 2019/0036121 A1 | 1/2019 | Cho et al. |
| 2020/0044241 A1 | 2/2020 | Gigler et al. |
| 2020/0091517 A1 | 3/2020 | Yushin et al. |
| 2020/0152973 A1 | 5/2020 | Mason et al. |
| 2020/0152974 A1 | 5/2020 | Mason et al. |
| 2020/0266444 A1 | 8/2020 | Joon Sup et al. |
| 2020/0269207 A1 | 8/2020 | Zatiropoulos |
| 2020/0373561 A1 | 11/2020 | Mason et al. |

FOREIGN PATENT DOCUMENTS

| | | |
|---|---|---|
| CN | 102509781 B1 | 4/2015 |
| CN | 104577084 A | 4/2015 |
| CN | 103936003 B1 | 3/2016 |
| CN | 105489891 A | 4/2016 |
| CN | 103840140 B | 12/2017 |
| CN | 107425180 A | 12/2017 |
| CN | 107863513 A | 3/2018 |
| CN | 108428876 A | 8/2018 |
| CN | 109004203 A | 12/2018 |
| CN | 110085811 A | 8/2019 |
| CN | 110311125 A | 10/2019 |
| DE | 102014211012 A1 | 12/2015 |
| EP | 3 086 388 B1 | 6/2018 |
| JP | 2003100284 A | 4/2003 |
| JP | 4069465 B2 | 4/2008 |
| JP | 5647366 B1 | 12/2014 |
| JP | 6167127 B2 | 7/2017 |
| JP | 6451340 B2 | 1/2019 |
| KR | 101665099 B1 | 10/2016 |
| KR | 20160126857 A | 11/2016 |
| KR | 20180024922 A | 3/2018 |
| KR | 2018-0072112 A | 6/2018 |
| KR | 20180078176 A | 7/2018 |
| KR | 101898110 B1 | 9/2018 |
| KR | 10-1929413 B1 | 12/2018 |
| KR | 10-2063809 B1 | 1/2020 |
| KR | 10-2139736 B1 | 7/2020 |
| WO | WO 200227822 A1 | 4/2002 |
| WO | WO 2012097969 A1 | 7/2012 |
| WO | WO 2016116323 A1 | 7/2016 |
| WO | WO 2017040299 A1 | 3/2017 |
| WO | WO 2018165610 A1 | 9/2018 |
| WO | WO 2018166735 A1 | 9/2018 |

OTHER PUBLICATIONS

Holzapfel et al., "A new type of nano-sized silicon/carbon composite electrode for reversible lithium insertion," Chem. Commun., 1566-68 (2005).

Holzapfel et al., "Chemical Vapor Deposited Silicon/Graphite Compound Material as Negative Electrode for Lithium-Ion Batteries," Electrochem. And Sol. State Lett., 8(10), A516-520 (2005).

Holzapfel et al., "Nano silicon for lithium-ion batteries," Electrochem. Acta, 52, 973-78 (2006).

Jaumann et al., "Dichlorosilane-Derived Nano-Silicon inside Hollow Carbon Spheres as High-Performance Anode in Li-Ion Batteries," J. Mater. Chem. A, 5, 9262-9271 (2017).

Jaumann et al.,"SEI-component formation on sub 5 nm sized silicon nanoparticles in Li-ion batteries: the role of electrode preparation, FEC addition and binders," Phys. Chem. Chem. Phus., 17(38), 24956-67 (2015).

Kaae, J. L., "Coating of small particles by chemical vapor deposition while the particles are fluidized," Mat. Res. Soc. Symp. Proc. 372, 139 (1995).

Krzeminski et al., "Silicon dry oxidation kinetics at low temperature in the nanometric range: modeling and experiment," arXiv:1106.3160v1, available at https://arxiv.org/pdf/1106.3160v1.pdf, 54 pages (2011).

Magasinksi et al., "High-performance lithium-ion anodes using a hierachical bottom-up approach," Nature Materials, 9 (4), 352-58 (2010).

Kouadri-Mostefa et al., "Silicon Chemical Vapor Deposition (CVD) on microporous powders in a fluidized bed," Powder Technology, 120, 82-87 (2001).

Pflitsch et al., "Chenmical vapor infiltration of activated carbon with tetramethylsilate," Carbon, 79(1), 28-35 (2014).

Reuge et al.,"Modeling of Silicon CVD into Agglomerates of Sub/micrometersiz Particles in a Fluidized Bed," Chem. Vap. Deposition 17, 305-311 (2011).

Saito et al., "Solution combustion synthesis of porous Sn—C composite as anode material for lithium ion batteries," Adv. Powder. Tech., 27,1730-37 (2016).

Vahlas et al., "Principles and applications of CVD powder technology," Mat. Sci. and Eng., R53, 1-72 (2006).

Wang et al., "Chemical vapor deposition and atomic layer deposition for advanced lithium ion batteries and supercapacitors," Energy & Env. Sci., 8, 1889-2014 (2015).

Wang et al., "Facile Preparation of Hierarchically Porous Carbon Monoliths with Well-Ordered Mesostructures," Chem. Mater., 18, 6373-6381 (2006).

Wang et al.,"Synthesis of monolithic 3D ordered macroporous carbon/nano-silicon composites by diiodosilane decomposition," Carbon, 46, 1702-1710 (2008).

Wilson et al., "Carbonaceous Materials Containing Silicon As Anodes for Lithium-Ion Cells," Mat. Res. Soc. Symp. Proc., vol. 393, 305 (1995).

Wilson et al., "Nanodispersed silicon in pregraphitic Carbons," J. Appl. Lett. Phys., 77, 2363-69 (1995).

Yano et al. "Novel method to incorporate Si into monodispersed mesoporous carbon spheres," J. Colloid and Int. Sci., 479, 20-24 (2016).

Yano et al., "Incorporation of silicon into monodispersed starburst carbon spheres with LVD method," Microporous and Mesoporous Mat., 247, 46-51 (2017).

Zhang et al.,"Tin-Nanoparticles Encapsulated in Elastic Hollow Carbon Spheres," Adv. Mater. 20, 1160-1165 (2008).

Search and Examination Report issued in co-pending Great Britain Patent Application No. GB1818232.9, dated Dec. 24, 2018, 9 pages.

Search and Examination Report issued in co-pending Great Britain Patent Application No. GB1818235.2, dated Dec. 24, 2018, 9 pages.

Search and Examination Report issued in co-pending Great Britain Patent Application No. GB1820736.5, dated Jan. 9, 2019, 9 pages.

Search and Examination Report issued in co-pending Great Britain Patent Application No. GB1820742.3, dated Jan. 9, 2019, 9 pages.

Co-Pending U.S. Appl. No. 16/247,182, filed Feb. 12, 2019.
Co-Pending U.S. Appl. No. 16/274,185, filed Feb. 12, 2019.
Co-Pending U.S. Appl. No. 16/867,354, filed May 5, 2020.
Co-Pending U.S. Appl. No. 17/024,402, filed Sep. 17, 2020.

Shen et al., "Research progress on silicon/carbon composite anode materials for lithium-ion battery," J. Energy Chemistry, 27, 1067-1090 (2018).

Zuo et al., "Silicone based lithium-ion battery anodes: A chronicle perspective review," Nano Energy, 31, 113-143 (2017).

\* cited by examiner

ELECTROACTIVE MATERIALS FOR METAL-ION BATTERIES

CROSS-REFERENCE TO RELATED APPLICATIONS

This application claims the benefit of priority of United Kingdom Patent Application no. GB 2012062.2, filed Mar. 8, 2020, which is hereby incorporated herein by reference in its entirety.

FIELD OF THE DISCLOSURE

This invention relates in general to electroactive materials that are suitable for use in electrodes for rechargeable metal-ion batteries, and more specifically to particulate materials having high electrochemical capacities that are suitable for use as anode active materials in rechargeable metal-ion batteries.

TECHNICAL BACKGROUND

Rechargeable metal-ion batteries are widely used in portable electronic devices such as mobile telephones and laptops and are finding increasing application in electric or hybrid vehicles. Rechargeable metal-ion batteries generally comprise an anode in the form of a metal current collector provided with a layer of an electroactive material, defined herein as a material that is capable of inserting and releasing metal ions during the charging and discharging of a battery. The terms "cathode" and "anode" are used herein in the sense that the battery is placed across a load, such that the anode is the negative electrode. When a metal-ion battery is charged, metal ions are transported from the metal-ion-containing cathode layer via the electrolyte to the anode and are inserted into the anode material. The term "battery" is used herein to refer both to a device containing a single anode and a single cathode and to devices containing a plurality of anodes and/or a plurality of cathodes.

There is interest in improving the gravimetric and/or volumetric capacities of rechargeable metal-ion batteries. To date, commercial lithium-ion batteries have largely been limited to the use of graphite as an anode active material. When a graphite anode is charged, lithium intercalates between the graphite layers to form a material with the empirical formula $Li_xC_6$ (wherein x is greater than 0 and less than or equal to 1). Consequently, graphite has a maximum theoretical capacity of 372 mAh/g in a lithium-ion battery, with a practical capacity that is somewhat lower (ca. 340 to 360 mAh/g). Other materials, such as silicon, tin and germanium, are capable of intercalating lithium with a significantly higher capacity than graphite but have yet to find widespread commercial use due to difficulties in maintaining sufficient capacity over numerous charge/discharge cycles.

Silicon in particular has been identified as a promising alternative to graphite for the manufacture of rechargeable metal-ion batteries having high gravimetric and volumetric capacities because of its very high capacity for lithium (see, for example, Insertion Electrode Materials for Rechargeable Lithium Batteries, Winter, M. et al. in Adv. Mater. 1998, 10, No. 10). At room temperature, silicon has a theoretical maximum specific capacity in a lithium-ion battery of about 3,600 mAh/g (based on $Li_{15}Si_4$). However, the intercalation of lithium into bulk silicon leads to a large increase in the volume of the silicon material of up to 400% of its original volume when silicon is lithiated to its maximum capacity. Repeated charge-discharge cycles cause significant mechanical stress in the silicon material, resulting in fracturing and delamination of the silicon anode material. Volume contraction of silicon particles upon delithiation can result in a loss of electrical contact between the anode material and the current collector. A further difficulty is that the solid electrolyte interphase (SEI) layer that forms on the silicon surface does not have sufficient mechanical tolerance to accommodate the expansion and contraction of the silicon. As a result, newly exposed silicon surfaces lead to further electrolyte decomposition and increased thickness of the SEI layer and irreversible consumption of lithium. These failure mechanisms collectively result in an unacceptable loss of electrochemical capacity over successive charging and discharging cycles.

A number of approaches have been proposed to overcome the problems associated with the volume change observed when charging silicon-containing anodes. It has been reported that fine silicon structures below around 150 nm in cross-section, such as silicon films and silicon nanoparticles are more tolerant of volume changes on charging and discharging when compared to silicon particles in the micron size range. However, neither of these is suitable for commercial scale applications in their unmodified form; nanoscale particles are difficult to prepare and handle and silicon films do not provide sufficient bulk capacity.

WO 2007/083155 discloses that improved capacity retention may be obtained with silicon particles having high aspect ratio, i.e. the ratio of the largest dimension to the smallest dimension of the particle. The small cross-section of such particles reduces the structural stress on the material due to volumetric changes on charging and discharging. However, such particles may be difficult and costly to manufacture and can be fragile. In addition, high surface area may result in excessive SEI formation, resulting in excessive loss of capacity on the first charge-discharge cycle.

It is also known in general terms that electroactive materials such as silicon may be deposited within the pores of a porous carrier material, such as an activated carbon material. These composite materials provide some of the beneficial charge-discharge properties of nanoscale silicon particles while avoiding the handling difficulties of nanoparticles. Guo et al. (Journal of Materials Chemistry A, 2013, pp. 14075-14079) discloses a silicon-carbon composite material in which a porous carbon substrate provides an electrically conductive framework with silicon nanoparticles deposited within the pore structure of the substrate with uniform distribution. It is shown that the composite material has improved capacity retention over multiple charging cycles, however the initial capacity of the composite material in mAh/g is significantly lower than for silicon nanoparticles.

JP 2003100284 discloses an active material comprising a carbon-based scaffold with small pores branching off from a few larger pores. An electroactive material (e.g. silicon) is indiscriminately located on the walls of both large and small pores and on the external surface of the carbon-based scaffold.

Silicon sub-oxide materials (e.g. $SiO_x$, wherein $0<x<2$) have been used in "hybrid" electrodes that comprise predominantly graphite as the active materials. However, due to expansion of the $SiO_x$ on lithiation and a relatively high irreversible lithium loss during the first charge cycle, the maximum loading of $SiO_x$ is typically around 10 wt % of the total electroactive materials in the electrode. There is therefore a need for high capacity electrode materials that have comparable lithiation capacity to silicon oxides but reduced expansion and reduced capacity loss during the first charge cycle.

SUMMARY OF THE DISCLOSURE

In a first aspect, the invention provides a particulate material consisting of a plurality of composite particles, wherein the composite particles comprise:
(a) a porous carbon framework comprising micropores and mesopores,
wherein the micropores and mesopores have a total pore volume as measured by gas adsorption of $P^1$ cm$^3$/g, wherein $P^1$ represents a natural number having a value of from 0.5 to 1.5,
wherein the $PD_{90}$ pore diameter is at least 3 nm and less 12 nm; and wherein the micropore volume fraction based on $P^1$ is from 0.43 to 0.85; and
(b) a plurality of nanoscale elemental silicon domains located within the pores of the porous carbon framework,
wherein the particulate material comprises from 25 to 65 wt % silicon, and wherein at least 20 wt % of the silicon is surface silicon as determined by thermogravimetric analysis (TGA).

According to a second aspect of the invention, there is provided a process for preparing silicon-containing composite particles, the process comprising the steps of:
(a) providing a plurality of porous carbon particles comprising micropores and/or mesopores, wherein:
(i) the micropores and mesopores have a total pore volume as measured by gas adsorption of $P^1$ cm$^3$/g, wherein $P^1$ represents a natural number having a value of from 0.5 to 1.5,
(ii) the $PD_{90}$ pore diameter is at least 3 nm and less 12 nm; and
(iii) the micropore volume fraction based on $P^1$ is from 0.43 to 0.85;
(b) contacting the plurality of porous carbon particles with a gas comprising 0.5 to 20 vol % of a silicon precursor gas at a temperature from 400 to 700° C.

In a third aspect of the invention, there is provided a composition comprising a particulate material according to the first aspect of the invention and at least one other component. In particular, there is provided a composition comprising a particulate material according to the first aspect of the invention and at least one other component selected from: (i) a binder; (ii) a conductive additive; and (iii) an additional particulate electroactive material. The composition according to the third aspect of the invention is useful as an electrode composition, and thus may be used to form the active layer of an electrode.

In a fourth aspect, the invention provides an electrode comprising a particulate material as defined with reference to the first aspect of the invention in electrical contact with a current collector. The particulate material used to prepare the electrode of the fourth aspect of the invention may have any of the features described as preferred or optional with regard to the first aspect of the invention.

In a fifth aspect, the present invention provides a rechargeable metal-ion battery comprising an anode, the anode comprising an electrode as described above, a cathode comprising a cathode active material capable of releasing and reabsorbing metal ions; and an electrolyte between the anode and the cathode. Additional aspects will be evident to the person of skill in the art in view of the disclosure herein.

DETAILED DESCRIPTION

Figure 1:
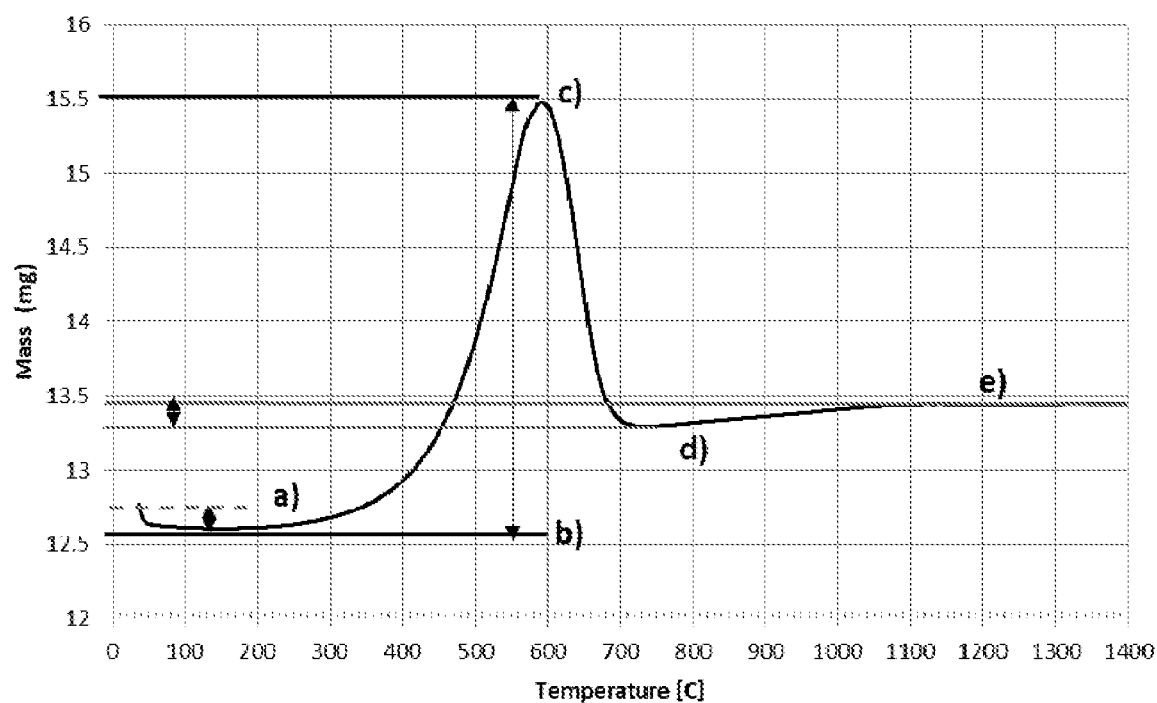
FIG. 1 shows the TGA trace for a particulate material according to the invention, comprising a high level of surface silicon and a low level of bulk coarse silicon.

The present inventors have noted that the desirable expansion properties of electrode materials must be obtained alongside other important properties. In particular, a commercially viable alternative electrode material needs to provide the benefit of high lithiation capacity alongside with high capacity retention over large numbers of charge-discharge cycles. In addition, it is important that any new electroactive material should be readily substitutable for known materials in conventional electrode fabrication processes. These processes typically rely on calendering of electrode materials onto current collectors in order to densify the electrode layers and to improve space utilization within a battery design. Porous materials are vulnerable to fracturing during electrode fabrication, resulting in impaired electrochemical performance. It is therefore a particular requirement that new electrochemical materials should have sufficient structural strength alongside increased electrochemical storage capacity and reversible capacity retention.

The inventors have determined that the performance of composite materials comprising silicon and porous carbon depends on the pore structure of the porous carbon framework as well as the amount of silicon and the way it is distributed throughout the porous carbon framework. It has now further been identified that the performance of these composite materials depends on the location of the silicon, its characteristic length scale and surface functionality.

It is known in general terms that atoms at the surface of a material have different set of bonding interactions to atoms in the bulk of the material, and this difference is usually described in terms of the surface energy of the material. In the case of silicon that has been deposited by chemical vapor infiltration (CVI), the free valencies of silicon atoms at the surface generally carry hydride groups. If this hydride-terminated silicon surface is accessible to air, it reacts with oxygen to form a native oxide surface. However, surfaces that are not accessible to air remain in the hydride-terminated form.

It has been found that composite materials having a high proportion of hydride-terminated surface silicon without a native oxide layer provide improved performance as electroactive materials. The amount of this hydride-terminated surface silicon can be quantified using thermogravimetric analysis (TGA).

In a first aspect, the invention provides a particulate material consisting of a plurality of composite particles, wherein the composite particles comprise:
(a) a porous carbon framework comprising micropores and mesopores,
wherein the micropores and mesopores have a total pore volume as measured by gas adsorption of $P^1$ cm$^3$/g, wherein $P^1$ represents a natural number having a value of from 0.5 to 1.5, wherein the $PD_{90}$ pore diameter is at least 3 nm and less 12 nm; and wherein the micropore volume fraction based on $P^1$ is from 0.43 to 0.85; and (b) a plurality of nanoscale elemental silicon domains located within the pores of the porous carbon framework, wherein the particulate material comprises from 25 to 65 wt % silicon, and wherein at least 20 wt % of the silicon is surface silicon as determined by thermogravimetric analysis (TGA).

As a result of this unique particle architecture, the composite particles have electrochemical performance that improves upon the incumbent $SiO_x$ technology. In particular, the particulate material of the invention has a greater electrochemical capacity, lower overall expansion, and comparable reversible capacity retention, resulting in the potential for higher loadings of the high capacity electroactive material than have been achieved previously.

The composite particles of the invention have a structure in which a plurality of elemental nanoscale silicon domains are located within the pore network of the porous carbon framework. As used herein, the term "nanoscale silicon domain" refers to a nanoscale body of silicon having dimensions that are imposed by the location of the silicon within the micropores and/or mesopores of the porous carbon framework.

The microporous carbon framework provides the benefit that electroactive materials are located within the micropore network in the form of small domains with dimensions of the order of a few nanometres or less. These fine electroactive structures have a lower resistance to elastic deformation and higher fracture resistance than larger electroactive structures, and are therefore able to lithiate and delithiate without excessive structural stress. The microporosity of the porous carbon framework therefore ensures that the electroactive material itself is sufficiently resilient to withstand repeated volume changes over multiple charge-discharge cycles without significant loss of capacity.

The particulate material of the invention is characterized by a high content of unoxidized surface silicon as quantified by TGA analysis. This method of analysis relies on the principle that a weight gain is observed when silicon is oxidized to silicon dioxide ($SiO_2$) in air and at elevated temperature. The mechanisms by which silicon oxidizes are dependent on temperature. Silicon atoms at the surface of a silicon nanostructure are oxidized at a lower temperature than silicon atoms in the bulk of a silicon nanostructure (reference: Bardet et al., *Phys. Chem. Chem. Phys.* (2016), 18, 18201). TGA analysis allows for the relative content of surface silicon to be quantified, based on the weight gain that is observed as silicon is oxidized to silicon dioxide ($SiO_2$) in air and at elevated temperature. By plotting the weight gain against temperature, it is possible to differentiate and quantify the bulk and surface silicon in the sample.

FIG. 1 shows the TGA trace for a particulate material according to the invention, comprising a high level of surface silicon and a low level of bulk coarse silicon.

Figure 2:
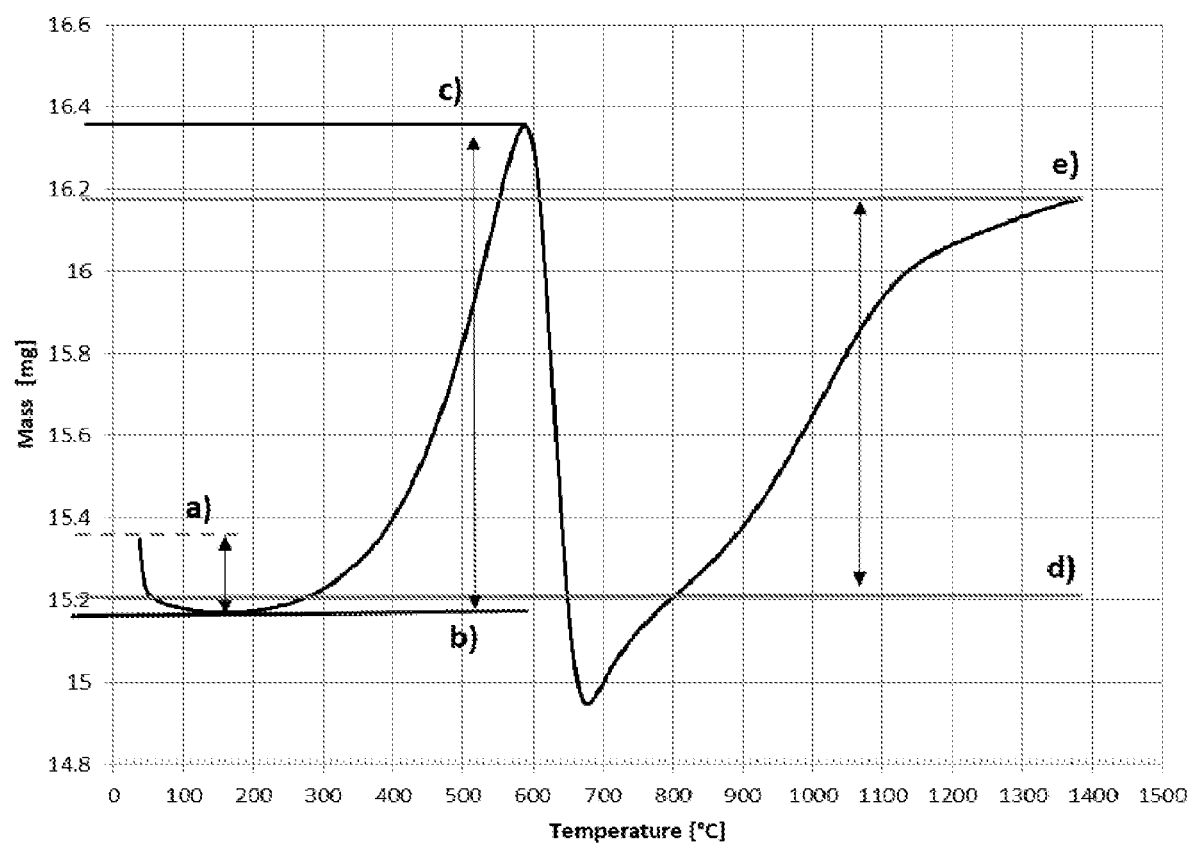
FIG. 2 shows the TGA trace for a particulate material comprising a low level of surface silicon and a high level of bulk coarse silicon.

FIG. 2 shows the TGA trace for a particulate material comprising a low level of surface silicon and a high level of bulk coarse silicon.

The determination of the amount of unoxidized surface silicon is derived from the characteristic TGA trace for these materials, as shown in FIGS. 1 and 2. Following an initial mass loss up to ca. 300° C. (shown in FIGS. 1 and 2 as the mass reduction from (a) to (b)) a significant increase in mass is observed starting at ca. 400° C. and peaking between 550° C. and 650° C. (shown in FIGS. 1 and 2 as the mass increase from (b) to (c)). A reduction in mass is then observed as the porous carbon framework is oxidized to $CO_2$ gas (the mass reduction from (c)), then above ca. 800° C. a mass increase is again observed corresponding to the continued conversion of silicon to $SiO_2$ which increases toward an asymptotic value above 1000° C. as silicon oxidation goes to completion (the mass increase from (d) to (e)). The temperature at which the weight increase occurs is related to the structure of the silicon, with surface silicon oxidized at low temperatures and bulk silicon oxidized at higher temperatures. Therefore, the more coarse the silicon domains, the more oxidation is observed at higher temperatures.

Any native oxide that is already formed on silicon surfaces that are exposed to air does not affect the TGA analysis, since silicon that is already oxidized does not give rise to a mass increase in the TGA analysis. Therefore the more the silicon surfaces are able to react with air to form a native oxide, the less surface silicon is observed by TGA. For avoidance of doubt, the calculation of "surface silicon" therefore takes into account only silicon that is unoxidized at the start of the TGA analysis after the material has been passivated in air (i.e. the particulate material is not kept under any special inert conditions prior to the TGA analysis).

As defined herein, "surface silicon" is calculated from the initial mass increase in the TGA trace from a minimum between 150° C. and 500° C. to the maximum mass measured in the temperature range between 550° C. and 650° C., wherein the TGA is carried out in air with a temperature ramp rate of 10° C./min. This mass increase is assumed to result from the oxidation of surface silicon and therefore allows the percentage of surface silicon as a proportion of the total amount of silicon to be determined according to the following formula:

$$Y=1.875\times[(M_{max}-M_{min})/M_f]\times100\%$$

Wherein Y is the percentage of surface silicon as a proportion of the total silicon in the sample, $M_{max}$ is the maximum mass of the sample measured in the temperature range between 550° C. to 650° C. (mass (c) in FIGS. 1 and 2), $M_{min}$ is the minimum mass of the sample above 150° C. and below 500° C. (mass (b) in FIGS. 1 and 2), and $K_f$ is the mass of the sample at completion of oxidation at 1400° C. (mass (e) in FIGS. 1 and 2). For completeness, it will be understood that 1.875 is the molar mass ratio of $SiO_2$ to $O_2$ (i.e. the mass ratio of $SiO_2$ formed to the mass increase due to the addition of oxygen).

It has been found that reversible capacity retention over multiple charge/discharge cycles is considerably improved when the surface silicon as determined by the TGA method described above is at least 20 wt % of the total amount of silicon in the material. Preferably at least 22 wt %, or at least 25 wt %, at least 30 wt % of the silicon, or at least 35 wt % of the silicon, or at least 40 wt % of the silicon is surface silicon as determined by thermogravimetric analysis (TGA).

Optionally, the amount of surface silicon as determined by TGA is up to 80 wt %, or up to 75 wt %, or up to 70 wt %, or up to 65 wt %, or up to 60 wt %, or up to 55 wt % of the total amount of silicon in the particulate material. For example, the amount of surface silicon as determined by TGA may be from 20 to 80 wt %, or from 22 to 75 wt %, or from 25 to 70 wt %, or from 30 to 65 wt %, or from 35 to 60 wt %, or from 40 to 55 wt % of the total amount of silicon in the particulate material. The amount of surface silicon as determined by TGA may also be in the range from 20 to 55 wt %, or from 22 to 60 wt %, or from 25 to 65 wt %, or from 30 to 70 wt %, or from 35 to 75 wt %, or from 40 to 80 wt % of the total amount of silicon in the particulate material. Further preferred ranges may be defined by combining the upper and lower limits of any of the aforementioned ranges.

The fact that a significant proportion of hydride-terminated surface silicon is measurable in the particulate material even after passivation in air indicates that the composite particles contain internal silicon surfaces that are inaccessible to air. This indicates that the internal pore spaces of the porous carbon framework are first lined with silicon before being capped to form an internal void space with the hydride-terminated silicon surfaces oriented into the closed internal void space. This in turn indicates that the silicon domains have a characteristic length scale that is much smaller that the pores themselves.

As the internal voids are inaccessible to electrolyte, the silicon surfaces are protected from SEI formation, thereby minimising irreversible lithium loss during the first charge cycle. Additional exposure of the electroactive material in subsequent charge-discharge cycles is also substantially prevented such that SEI formation is not a significant failure mechanism leading to capacity loss. Simultaneously, this silicon is constrained hydrostatically during lithiation enabling utilization of the voids during lithiation induced expansion.

The porous carbon framework comprises a three-dimensionally interconnected open pore network comprising micropores and mesopores. The porous carbon framework may optionally further comprise a minor volume of macropores. In accordance with conventional IUPAC terminology, the term "micropore" is used herein to refer to pores of less than 2 nm in diameter, the term "mesopore" is used herein to refer to pores of 2-50 nm in diameter, and the term "macropore" is used to refer to pores of greater than 50 nm diameter.

It has been found that the high level of surface silicon required by the invention is obtained only when the pore structure of the porous carbon framework is controlled within specific limits as defined above. References herein to the volume of micropores, mesopores and macropores in the porous carbon framework, and any references to the distribution of pore volume within the porous carbon framework, refer to the internal pore volume of the porous carbon framework taken in isolation (i.e. in the absence of any electroactive material or other materials occupying some or all of the pore volume).

The total volume of micropores and mesopores (i.e. the total pore volume of pores having a diameter in the range of 0 to 50 nm) is referred to herein as $P^1$ cm$^3$/g, wherein $P^1$ represents a dimensionless natural number having a value of from 0.5 to 1.5. For the avoidance of doubt, references herein to the pore volume of the porous carbon framework relate (in the absence of any indication to the contrary) to the pore volume of the porous carbon framework in isolation, i.e. as measured in the absence of any electroactive material (or any other material) occupying the pores of the porous carbon framework.

The value of $P^1$ is preferably at least 0.55, or at least 0.6, or at least 0.65, or at least 0.7. A higher porosity framework is advantageous since it allows a larger amount of silicon to be accommodated within the pore structure without compromising the resistance of the porous carbon framework to fracturing under compressive stress during electrode manufacture or expansion stress due to lithiation of the silicon. If $P^1$ is too high, however, then it is not possible to achieve the elevated levels of surface silicon that characterize this invention. Accordingly, $P^1$ is no more than 1.5, or no more than 1.4, or no more than 1.3, or no more than 1.2, or no more than 1.1, or no more than 1.

For example, $P^1$ may be in the range from 0.55 to 1.4, or from 0.6 to 1.4, or from 0.6 to 1.3, or from 0.65 to 1.3, or from 0.65 to 1.2, or from 0.7 to 1.2, or from 0.7 to 1.1, or from 0.7 to 1, The total volume of micropores and mesopores and the pore size distribution of micropores and mesopores are determined using nitrogen gas adsorption at 77 K down to a relative pressure $p/p_0$ of $10^{-6}$ using quenched solid density functional theory (QSDFT) in accordance with standard methodology as set out in ISO 15901-2 and ISO 15901-3. Nitrogen gas adsorption is a technique that characterizes the porosity and pore diameter distributions of a material by allowing a gas to condense in the pores of a solid. As pressure increases, the gas condenses first in the pores of smallest diameter and the pressure is increased until a saturation point is reached at which all of the pores are filled with liquid. The nitrogen gas pressure is then reduced incrementally, to allow the liquid to evaporate from the system. Analysis of the adsorption and desorption isotherms, and the hysteresis between them, allows the pore volume and pore size distribution to be determined. Suitable instruments for the measurement of pore volume and pore size distributions by nitrogen gas adsorption include the TriStar II and TriStar II Plus porosity analyzers that are available from Micromeritics Instrument Corporation, USA, and the Autosorb IQ porosity analyzers that are available from Quantachrome Instruments.

Nitrogen gas adsorption is effective for the measurement of pore volume and pore size distributions for pores having a diameter up to 50 nm, but is less reliable for pores of much larger diameter. For the purposes of the present invention, nitrogen adsorption is therefore used to determine pore volumes and pore size distributions only for pores having a diameter up to and including 50 nm. As set out above, the value of $P^1$ is determined by taking into account only pores of diameter up to and including 50 nm (i.e. only micropores and mesopores).

The general term "$PD_n$ pore diameter" refers herein to the volume-based nth percentile pore diameter, based on the total volume of micropores and mesopores. For instance, the term "$PD_{90}$ pore diameter" as used herein refers to the pore diameter below which 90% of the total micropore and mesopore volume, represented by $P^1$, is found).

As set out above, the $PD_{90}$ pore diameter of the porous carbon framework is at least 3 nm and less 12 nm. It has been found that if the $PD_{90}$ value is too low then it is not possible to deposit silicon into micropores and silicon instead deposits on the external surfaces of the porous carbon framework. However, if the $PD_{90}$ value is too high, then excessive deposits of coarse silicon and/or excessive native oxide formation result in a low content of surface silicon.

The $PD_{90}$ pore diameter of the porous carbon framework is preferably no more than 10 nm, or no more than 8 nm, or no more than 6 nm. Preferably, the $PD_{90}$ pore diameter of the porous carbon framework is at least 3.2 nm, or at least 3.5 nm, or at least 3.8 nm, or at least 4 nm.

The $PD_{75}$ pore diameter of the porous carbon framework is preferably no more than 10 nm, or no more than 8 nm, or no more than 6 nm, or no more than 4 nm. The $PD_{75}$ pore diameter of the porous carbon framework is preferably at least 1 nm.

The $PD_{50}$ pore diameter of the porous carbon framework is preferably no more than 2 nm, or no more than 1.9 nm, or no more than 1.8 nm, or no more than 1.7 nm, or no more than 1.6 nm. Preferably, the $PD_{50}$ pore diameter of the porous carbon framework is at least 1 nm, or at least 1.1 nm, or at least 1.2 nm.

The $PD_{30}$ pore diameter of the porous carbon framework is preferably no more than 1.6 nm, or no more than 1.5 nm, or no more than 1.4 nm, or no more than 1.3 nm, or no more than 1.2 nm, or no more than 1.1 nm, or no more than 1 nm. Preferably, the $PD_{30}$ pore diameter of the porous carbon framework is at least 0.6 nm, or at least 0.7 nm.

The $PD_{30}$ pore diameter of the porous carbon framework is preferably at least 0.45 nm, or at least 0.5 nm, or at least 0.55 nm, or at least 0.6 nm.

The ratio of the $PD_{90}$ to $PD_{30}$ pore diameters is preferably no more than 14, or no more than 12, or no more than 10, or no more than 8.

The ratio of the $PD_{90}$ to $PD_{10}$ pore diameters is preferably no more than 11, or no more than 10, or no more than 9, or no more than 8, or no more than 7.

As used herein, the micropore volume fraction refers to the volume of micropores expressed as a fraction of the total volume of micropores and mesopores, represented by $P^1$. Put another way, the micropore volume fraction is the volume fraction of pores having diameter of 2 nm or less relative to the total volume of pores having a diameter of up to 50 nm. As discussed above, the micropore volume fraction of the porous framework is selected within the range of 0.43 to 0.85, in order to obtain the required high level of surface silicon content in the composite particles.

Preferably, the micropore volume fraction is at least 0.45, or at least 0.48, or at least 0.5, or at least 0.51, or at least 0.52, or at least 0.54, or at least 0.56, or at least 0.58, or at least 0.6 based on the total volume of micropores and mesopores. Preferably, the micropore volume fraction is no more than 0.8, or no more than 0.79, or no more than 0.78, or no more than 0.76, or no more than 0.74, or no more than 0.72, or no more than 0.7, based on the total volume of micropores and mesopores.

The micropore volume fraction may optionally be in the range from 0.45 to 0.85, or from 0.5 to 0.8, or from 0.45 to 0.78, or from 0.48 to 0.8, or from 0.48 to 0.78, or from 0.48 to 0.76, or 0.5 to 0.8, or from 0.5 to 0.78, or from 0.5 to 0.76, or from 0.5 to 0.74, or from 0.5 to 0.72, or from 0.5 to 0.7, or from 0.51 to 0.76, or from 0.52 to 0.74, or from 0.53 to 0.74, or from 0.54 to 0.72, or from 0.6 to less than 0.8, or from 0.6 to 0.79, or from 0.6 to 0.78, or from 0.6 to 0.76, or from 0.6 to 0.74, or from 0.6 to 0.72, or from 0.6 to 0.7, based on the total volume of micropores and mesopores.

The total volume of micropores in the porous carbon framework (determined using nitrogen gas adsorption at 77 K as described herein) is preferably at least 0.36 cm$^3$/g, or at least 0.38 cm$^3$/g, at least 0.40 cm$^3$/g, at least 0.42 cm$^3$/g. As silicon located in micropores has a smaller length scale, a higher total micropore volume allows for a higher proportion of surface silicon to be accommodated within the porous carbon framework, thus allowing for a higher gravimetric and volumetric capacity of the composite particles.

Any pore volume in the mesopore range is preferably substantially in the smaller range of mesopores. Accordingly, the fractional volume of pores having a pore size of 5 nm or less is preferably at least 0.8, or at least 0.82, or at least 0.84, or at least 0.86, or at least 0.88, or at least 0.9, based on the total volume of micropores and mesopores. Preferably, the fractional volume of pores having a pore size of 10 nm or less is preferably at least 0.9, or at least 0.92, or at least 0.94, or at least 0.96, based on the total volume of micropores and mesopores. Preferably, the fractional volume of pores having a pore size of 20 nm or less is preferably at least 0.94, or at least 0.96, or at least 0.98, based on the total volume of micropores and mesopores.

A fraction of pores having diameters in the larger mesopore range may be advantageous to facilitate electrolyte access to the silicon domains. Therefore, pores having a diameter in the range of 10 to 50 nm (i.e. larger mesopores) may optionally constitute no more than 2%, or no more than 4%, or no more than 6% of the total micropore and mesopore volume of the porous carbon framework.

The pore size distribution of the porous carbon framework is preferably bimodal or multimodal. As used herein, the term "pore size distribution" relates to the distribution of pore size relative to the cumulative total internal pore volume of the porous carbon framework. A bimodal or multimodal pore size distribution may be preferred since close proximity between micropores and pores of larger diameter provides the advantage of efficient ionic transport through the porous network to the silicon. Accordingly, the particulate material has high ionic diffusivity and therefore improved rate performance.

In view of the limitations of available analytical techniques it is not possible to measure pore volumes and pore size distributions across the entire range of micropores, mesopores and macropores using a single technique. In the case that the porous carbon framework comprises macropores, the volume of pores in the range of greater than 50 nm and up to 100 nm is identified herein with the value of $P^2$ cm$^3$/g and is measured by mercury porosimetry. As set out above, the value of $P^2$ relates to the pore volume of the porous carbon framework when measured in isolation, i.e. in the absence of silicon or any other material occupying the pores of the porous carbon framework.

For the avoidance of doubt, the value of $P^2$ takes into account only pores having a diameter of from greater than 50 nm up to and including 100 nm, i.e. it includes only the volume of macropores up to 100 nm in diameter. Any pore volume measured by mercury porosimetry at pore sizes of 50 nm or below is disregarded for the purposes of determining the value of $P^2$ (as set out above, nitrogen adsorption is used to characterize the mesopores and micropores). Pore volume measured by mercury porosimetry above 100 nm is assumed for the purposes of the invention to be inter-particle porosity and is also not take into account when determining the value of $P^2$.

Mercury porosimetry is a technique that characterizes the porosity and pore diameter distributions of a material by applying varying levels of pressure to a sample of the material immersed in mercury. The pressure required to intrude mercury into the pores of the sample is inversely proportional to the size of the pores. Values obtained by mercury porosimetry as reported herein are obtained in accordance with ASTM UOP578-11, with the surface tension γ taken to be 480 mN/m and the contact angle φ taken to be 140° for mercury at room temperature. The density of mercury is taken to be 13.5462 g/cm$^3$ at room temperature. A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology", 1997, Micromeritics Instrument Corporation, ISBN 0-9656783-0.

The volume of macropores (and therefore the value of $P^2$) is preferably small as compared to the volume of micropores and mesopores (and therefore the value of $P^1$). While a small fraction of macropores may be useful to facilitate electrolyte access into the pore network, the advantages of the invention are obtained substantially by accommodating silicon in micropores and smaller mesopores.

Thus, in accordance with the invention the total volume of macropores in the porous carbon framework is $P^2$ cm$^3$/g as measured by mercury porosimetry, wherein $P^2$ preferably has a value of up to $0.2 \times P^1$, or up to $0.1 \times P^1$, or up to $0.05 \times P^1$, or up to $0.02 \times P^1$, or up to $0.01 \times P^1$, or up to $0.005 \times P^1$.

It will be appreciated that intrusion techniques such as gas adsorption and mercury porosimetry are effective only to determine the pore volume of pores that are accessible to nitrogen or to mercury from the exterior of the porous carbon framework. Porosity values ($P^1$ and $P^2$) as specified herein shall be understood as referring to the volume of open pores, i.e. pores that are accessible to a fluid from the exterior of the porous carbon framework. Fully enclosed pores that cannot be identified by nitrogen adsorption or mercury porosimetry shall not be taken into account herein when specifying porosity values. Likewise, any pore volume located in pores that are so small as to be below the limit of detection by nitrogen adsorption is not taken into account for determining the value of $P^1$.

The porous carbon framework preferably has a BET surface area from 1200 to 3000 m$^2$/g. Preferably the porous carbon framework has a BET surface area of at least 1500 m$^2$/g. The term "BET surface area" as used herein should be taken to refer to the surface area per unit mass calculated from a measurement of the physical adsorption of gas molecules on a solid surface, using the Brunauer-Emmett-Teller theory, in accordance with ISO 9277.

The porous carbon framework may comprise crystalline carbon or amorphous carbon, or a mixture of amorphous and crystalline carbon. The porous carbon framework may be either a hard carbon or soft carbon framework and may suitably be obtained by known procedures involving the pyrolysis of carbon-containing materials, including organic materials, resins and polymers. Porous carbon materials may also be obtained by other processes, for instance from carbide-containing precursors. Highly porous carbon materials are commercially available and are commonly referred to as activated carbons.

The porous carbon framework preferably has an elemental composition including at least 90 wt % carbon, preferably at least 95 wt % carbon, more preferably at least 98 wt % carbon, or at least 99 wt % carbon. The porous carbon framework may optionally comprise minor amounts of other elements, such as oxygen, nitrogen, sulphur and hydrogen. The elemental composition of the porous carbon framework may be determined by conventional elemental analysis techniques performed in the absence of silicon.

As used herein, the term "hard carbon" refers to a disordered carbon matrix in which carbon atoms are found predominantly in the sp$^2$ hybridized state (trigonal bonds) in nanoscale polyaromatic domains. The polyaromatic domains are cross-linked with a chemical bond, e.g. a C—O—C bond.

Due to the chemical cross-linking between the polyaromatic domains, hard carbons cannot be converted to graphite at high temperatures. Hard carbons have graphite-like character as evidenced by the large G-band (1600 cm$^{-1}$) in the Raman spectrum. However, the carbon is not fully graphitic as evidenced by the significant D-band (1350 cm$^{-1}$) in the Raman spectrum.

As used herein, the term "soft carbon" also refers to a disordered carbon matrix in which carbon atoms are found predominantly in the sp$^2$ hybridized state (trigonal bonds) in polyaromatic domains having dimensions in the range of 5-200 nm. In contrast to hard carbons, the polyaromatic domains in soft carbons are associated by intermolecular forces but are not cross-linked with a chemical bond. This means that they will graphitize at high temperature. The porous carbon framework preferably comprises at least 50% sp$^2$ hybridized carbon as measured by XPS. For example, the porous carbon framework may suitably comprise from 50% to 98% sp$^2$ hybridized carbon, from 55% to 95% sp$^2$ hybridized carbon, from 60% to 90% sp$^2$ hybridized carbon, or from 70% to 85% sp$^2$ hybridized carbon.

A variety of different materials may be used to prepare suitable porous carbon frameworks. Examples of organic materials that may be used include plant biomass including lignocellulosic materials (such as coconut shells, rice husks, wood etc.) and fossil carbon sources such as coal. Examples of resins and polymeric materials that form porous carbon frameworks on pyrolysis include phenolic resins, novolac resins, pitch, melamines, polyacrylates, polystyrenes, polyvinylalcohol (PVA), polyvinylpyrrolidone (PVP), and various copolymers comprising monomer units of acrylates, styrenes, α-olefins, vinyl pyrrolidone and other ethylenically unsaturated monomers. A variety of different hard carbon materials are available in the art depending on the starting material and the conditions of the pyrolysis process.

The porous carbon framework may undergo a chemical or gaseous activation process to increase the volume of mesopores and micropores. A suitable activation process comprises contacting pyrolyzed carbon with one or more of oxygen, steam, CO, CO$_2$ and KOH at a temperature in the range from 600 to 1000° C. Preferably, the porous carbon framework is a steam activated porous carbon framework.

Mesopores can also be obtained by known templating processes, using extractable pore formers such as MgO and other colloidal or polymer templates that can be removed by thermal or chemical means post pyrolysis or activation.

The elemental composition of the composite particles can be determined by elemental analysis. Elemental analysis is used to determine the weight percentages of both silicon and carbon in the composite particles. Optionally, the amounts of hydrogen, nitrogen and oxygen may also be determined by elemental analysis. Preferably, elemental analysis is also used to determine the weight percentage of carbon (and optionally hydrogen, nitrogen and oxygen) in the porous carbon framework alone. Determining the weight percentage of carbon in the in the porous carbon framework alone takes account of the possibility that the porous carbon framework contains a minor amount of heteroatoms within its molecular framework. Both measurements taken together allow the weight percentage of silicon relative to the entire porous carbon framework to be determined reliably.

The silicon content is preferably determined by ICP-OES (Inductively coupled plasma-optical emission spectrometry). A number of ICP-OES instruments are commercially available, such as the iCAP® 7000 series of ICP-OES analyzers available from ThermoFisher Scientific. The carbon content of the composite particles and of the porous carbon framework alone (as well as the hydrogen, nitrogen and oxygen content if required) are preferably determined by combustion and Infrared (IR) absorption techniques. A suitable instrument for determining carbon, hydrogen, nitrogen and oxygen content is the TruSpec® Micro elemental analyzer available from LECO Corporation.

The particulate material of the invention contains from 25 to 65 wt % silicon, and preferably from 30 to 65 wt % silicon, as determined by elemental analysis. Preferably, the particulate material of the invention contains at least 26 wt %, or at least 28 wt %, or at least 30 wt %, or at least 32 wt %, or at least 34 wt %, or at least 36 wt %, or at least 38 wt %, or at least 40 wt %, or at least 42 wt %, or at least 44 wt % silicon Preferably, the particulate material of the invention contains no more than 60 wt %, or no more than 58 wt %, or no more than 56 wt %, or no more than 54 wt %, or no more than 52 wt %, or no more than 50 wt % silicon.

For example, the particulate material of the invention may contain from 26 to 65 wt %, or from 28 to 65 wt %, or from 30 to 65 wt %, or from 32 to 60 wt %, or from 34 to 60 wt %, or from 36 to 60 wt %, or from 38 to 58 wt %, or from 40 to 58 wt %, or from 42 to 56 wt %, or from 44 to 54 wt % silicon.

A minimum amount of silicon is required to ensure that the particulate material has sufficient volumetric capacity for commercial use. However, an excessive amount of silicon results in silicon depositing in larger pores and/or on the surface of the porous carbon framework resulting in a lower content of surface silicon and inferior performance as an electroactive material.

The amount of silicon in the composite particles of the invention is selected such that at least around 20% and up to around 78% of the internal pore volume of the porous carbon framework (based on micropores and mesopores) is occupied by silicon (in the uncharged state). In general, the higher the microporous fraction of the porous carbon framework, the higher the amount of silicon that may be used without reducing the percentage of surface silicon.

Preferably the silicon occupies from about 20% to about 78% of the internal pore volume of the porous carbon framework, for example from about 23% to 75%, or about 26% to 72%, or from about 28% to 70%, or from about 30% to 70%, or from about 35% to 68%, or from about 40% to 65%, or from about 45 to 60% of the of the internal pore volume of the porous carbon framework. Within these preferred ranges, the pore volume of the porous carbon framework is effective to accommodate expansion of the silicon during charging and discharging, but avoids excess pore volume that does not contribute to the volumetric capacity of the particulate material. However, the amount of silicon is also not so high as to impede effective lithiation due to inadequate metal-ion diffusion rates or due to inadequate expansion volume resulting in mechanical resistance to lithiation.

The amount of silicon in the porous carbon framework can be correlated to the available pore volume by the requirement that the weight ratio of silicon to the porous carbon framework is in the range from $[0.50 \times P^1$ to $1.9 \times P^1]$: 1. This relationship takes into account the density of silicon and the pore volume of the porous carbon framework to define a weight ratio of silicon at which the pore volume is estimated to be around 20% to 78% occupied. Preferably, the weight ratio of silicon to the porous carbon framework is in the range from $[0.7 \times P^1$ to $1.8 \times P^1]$: 1, which indicates that the pore volume is around 30% to 78% occupied.

Preferably, the weight ratio of silicon to the porous carbon framework is at least $0.50 \times P^1$, or at least $0.55 \times P^1$, or at least $0.6 \times P^1$, or at least $0.65 \times P^1$, or $0.7 \times P^1$, or at least $0.75 \times P^1$, or at least $0.8 \times P^1$, or at least $0.85 \times P^1$, or at least $0.9 \times P^1$ or at least $0.95 \times P^1$, or at least $1 \times P^1$. Preferably, the weight ratio of silicon to the porous carbon framework is no more than $1.85 \times P^1$, or no more than $1.8 \times P^1$, or no more than $1.75 \times P^1$, or no more than $1.7 \times P^1$, or no more than $1.65 \times P^1$, or no more than $1.6 \times P^1$, or no more than $1.55 \times P^1$, or no more than $1.5 \times P^1$.

The composite particles preferably have a low total oxygen content, as determined by elemental analysis. Oxygen may be present in the composite particles for instance as part of the porous carbon framework or as an oxide layer on any exposed silicon surfaces. Preferably, the total oxygen content of the composite particles is less than 15 wt %, more preferably less than 12 wt %, more preferably less than 10 wt %, more preferably less than 5 wt %, for example less than 2 wt %, or less than 1 wt %, or less than 0.5 wt %. Preferably silicon and carbon together constitute at least 90 wt % of the composite particles, more preferably at least 95 wt % of the composite particles.

The silicon may optionally comprise a minor amount of one or more dopants. Suitable dopants include boron and phosphorus, other n-type or p-type dopants, nitrogen, or germanium. Preferably, the dopants are present in a total amount of no more than 2 wt % based on the total amount of silicon and the dopant(s).

In addition to the surface silicon content, the particulate material of the invention preferably has a low content of coarse bulk silicon as determined by TGA. Coarse bulk silicon is defined herein as silicon that undergoes oxidation above 800° C. as determined by TGA, wherein the TGA is carried out in air with a temperature ramp rate of 10° C./min. This is shown in FIGS. 1 and 2 as the mass increase from (d) to (e). The coarse bulk silicon content is therefore determined according to the following formula:

$$Z = 1.875 \times [(M_f - M_{800})/M_f] \times 100\%$$

Wherein Z is the percentage of unoxidized silicon at 800° C., $M_{800}$ is the mass of the sample at 800° C. (mass (d) in FIGS. 1 and 2), and $M_1$ is the mass of ash at completion of oxidation at 1400° C. (mass (e) in FIGS. 1 and 2). For the purposes of this analysis, it is assumed that any mass increase above 800° C. corresponds to the oxidation of silicon to $SiO_2$ and that the total mass at completion of oxidation is $SiO_2$.

Preferably, no more than 10 wt % of the silicon, or no more than 8 wt % of the silicon, or no more than 6 wt % of the silicon, or no more than 5 wt % of the silicon is coarse bulk silicon as determined by TGA.

Preferably at least 30 wt % of the silicon is surface silicon and no more than 10 wt % of the silicon is coarse bulk silicon, wherein both are determined by TGA. More preferably at least 35 wt % of the silicon is surface silicon and no more than 8 wt % of the silicon is coarse bulk silicon, wherein both are determined by TGA. More preferably, at least 40 wt % of the silicon is surface silicon and no more than 5 wt % of the silicon is coarse bulk silicon, wherein both are determined by TGA.

Preferably, the total volume of micropores and mesopores in the composite particles (i.e. in the presence of the silicon), as measured by nitrogen gas adsorption, is up to $0.15 \times P^1$, or up to $0.10 \times P^1$, or up to $0.05 \times P^1$, or up to $0.02 \times P^1$.

Preferably the total volume of micropores and mesopores in the composite particles, as measured by nitrogen gas adsorption, is less than 0.2 cm$^3$/g, preferably less than 0.15 cm$^3$/g, or less than 0.1 cm$^3$/g, or less than 0.08 cm$^3$/g, or less than 0.06 cm$^3$/g, or less than 0.04 cm$^3$/g, or less than 0.02 cm$^3$/g, or less than 0.015 cm$^3$/g, or less than 0.012 cm$^3$/g, or less than 0.010 cm$^3$/g, or less than 0.008 cm$^3$/g.

The term "particle diameter" as used herein refers to the equivalent spherical diameter (esd), i.e. the diameter of a sphere having the same volume as a given particle, wherein the particle volume is understood to include the volume of any intra-particle pores. The terms "$D_{50}$" and "$D_{50}$ particle diameter" as used herein refer to the volume-based median particle diameter, i.e. the diameter below which 50% by volume of the particle population is found. The terms "$D_{10}$"

and "$D_{10}$ particle diameter" as used herein refer to the 10th percentile volume-based median particle diameter, i.e. the diameter below which 10% by volume of the particle population is found. The terms "$D_{90}$" and "$D_{90}$ particle diameter" as used herein refer to the 90th percentile volume-based median particle diameter, i.e. the diameter below which 90% by volume of the particle population is found.

The terminology "$D_n$" used herein to define particle diameter distributions is to be distinguished from the terminology "$PD_n$" that is used herein, as described above, to define pore diameter distributions.

Particle diameters and particle size distributions can be determined by routine laser diffraction techniques in accordance with ISO 13320:2009. Unless stated otherwise, particle size distribution measurements as specified or reported herein are as measured by the conventional Malvern Mastersizer™ 3000 particle size analyzer from Malvern Instruments. The Malvern Mastersizer™ 3000 particle size analyzer operates by projecting a helium-neon gas laser beam through a transparent cell containing the particles of interest suspended in an aqueous solution. Light rays that strike the particles are scattered through angles that are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in 2-propanol with a 5 vol % addition of the surfactant SPAN™-40 (sorbitan monopalmitate). The particle refractive index is taken to be 2.68 for porous carbon framework particles and 3.50 for composite particles and the dispersant index is taken to be 1.378. Particle size distributions are calculated using the Mie scattering model.

The composite particles may have a $D_{50}$ particle diameter in the range from 1 to 30 μm. Optionally, the $D_{50}$ particle diameter may be at least 1 μm, or at least 2 μm, or at least 3 μm, or at least 4 μm, or at least 5 μm. Optionally the $D_{50}$ particle diameter may be no more than 20 μm, or no more than 18 μm, or no more than 16 μm, or no more than 14 μm, or no more than 12 μm, or no more than 10 μm, or no more than 8 μm.

For instance, the composite particles may have a $D_{50}$ particle diameter in the range from 1 to 20 μm, or from 1 to 18 μm, or from 1 to 16 μm, or from 2 to 16 μm, or from 2 to 14 μm, or from 2 to 12 μm, or from 2 to 10 μm, or from 2 to 8 μm. Particles within these size ranges and having porosity and a pore diameter distribution as set out herein are ideally suited for use in anodes for metal-ion batteries, due to their dispersibility in slurries, their structural robustness, their capacity retention over repeated charge-discharge cycles, and their suitability for forming dense electrode layers of uniform thickness in the conventional range from 20 to 50 μm.

The $D_{10}$ particle diameter of the composite particles is preferably at least 0.5 μm, or at least 0.8 μm, or at least 1 μm. By maintaining the $D_{10}$ particle diameter at 0.5 μm or more, the potential for undesirable agglomeration of sub-micron sized particles is reduced, resulting in improved dispersibility of the particulate material and improved capacity retention.

The $D_{90}$ particle diameter of the composite particles is preferably no more than 50 μm, or no more than 40 μm, or no more than 30 μm, or no more than 25 μm, or no more than 20 μm, or no more than 15 μm. The presence of very large particles results in non-uniform forming packing of the particles in electrode active layers, thus disrupting the formation of dense electrode layers, particularly electrode layers having a thickness in the range from 20 to 50 μm. Therefore, it is preferred that the $D_{90}$ particle diameter is up to 40 μm, and more preferably lower still.

The composite particles preferably have a narrow size distribution span. For instance, the particle size distribution span (defined as $(D_{90}-D_{10})/D_{50}$) is preferably 5 or less, more preferably 4 or less, more preferably 3 or less, more preferably 2 or less, and most preferably 1.5 or less. By maintaining a narrow size distribution span, efficient packing of the particles into dense electrode layers is more readily achievable.

The composite particles preferably have a positive skew in the volume-based distribution, for example, such that the volume based distribution is asymmetric with a longer tail on the right hand side. A positive skew in the volume-based particle size distribution is advantageous since it provides a denser electrode since the natural packing factor will be higher than if all particles are the same size, thereby reducing the need for calendering or other physical densification processes. Preferably, the $D_{50}$ composite particle size diameter is less than the volume-based mean of the particle size diameter distribution (D[4.3]). Preferably, the skew of the composite particle size distribution (as measured by a Malvern Mastersizer™ 3000 analyzer) is no more than 5, or no more than 3.

The composite particles may have an average sphericity (as defined herein) of at least 0.5, or at least 0.55. Preferably the average sphericity is at least 0.65, or at least 0.7, or at least 0.75, or at least 0.8.

It is possible to obtain highly accurate two-dimensional projections of micron scale particles by scanning electron microscopy (SEM) or by dynamic image analysis, in which a digital camera is used to record the shadow projected by a particle. The term "sphericity" as used herein shall be understood as the ratio of the area of the particle projection (obtained from such imaging techniques) to the area of a circle, wherein the particle projection and circle have identical circumference. Thus, for an individual particle, the sphericity S may be defined as:

$$S = \frac{4 \cdot \pi \cdot A_m}{(C_m)^2}$$

wherein $A_m$ is the measured area of the particle projection and $C_m$ is the measured circumference of the particle projection. The average sphericity $S_{av}$ of a population of particles as used herein is defined as:

$$S_{av} = \frac{1}{n}\sum_{i=1}^{n}\left[\frac{4 \cdot \pi \cdot A_m}{(C_m)^2}\right]$$

wherein n represents the number of particles in the population. The average sphericity for a population of particles is preferably calculated from the two-dimensional projections of at least 50 particles.

The composite particles of the invention preferably have a BET surface area of no more than 200 m²/g, or no more than 150 m²/g, or no more than 100 m²/g, or no more than 80 m²/g, or no more than 60 m²/g, or no more than 50 m²/g, or no more than 40 m²/g, or no more than 30 m²/g, or no more than 25 m$^2$/g, or no more than 20 m$^2$/g, or no more than 15 m$^2$/g, or no more than 10 m$^2$/g.

In general, a low BET surface area is preferred in order to minimize the formation of solid electrolyte interphase (SEI) layers at the surface of the composite particles during the first charge-discharge cycle of an anode comprising the particulate material of the invention. However, a BET surface area that is excessively low results in unacceptably low charging rate and capacity limitations due to the inaccessibility of the bulk of the electroactive material to metal ions in the surrounding electrolyte. For instance, the BET surface area is preferably at least 0.1 m$^2$/g, or at least 1 m$^2$/g, or at least 2 m$^2$/g, or at least 5 m$^2$/g. For instance, the BET surface area may be in the range from 1 m$^2$/g to 25 m$^2$/g, more preferably in the range from 2 to 15 m$^2$/g.

The particulate material of the invention typically has a specific charge capacity on first lithiation of 900 to 2300 mAh/g. Preferably, the particulate material of the invention has a specific charge capacity on first lithiation of at least 1200 mAh/g, or at least 1400 mAh/g.

The composite particles of the invention may optionally include a coating that at least partially or fully covers the external surfaces of the particles. The coating is preferably a lithium-ion permeable coating. As used herein, the term "lithium ion permeable" refers to an ionically conductive material that allows the transport of lithium ions from the exterior of the composite particles to the nanoscale electroactive material domains. Preferably, the lithium-ion permeable coating is impermeable to liquids, such as the solvents of liquid electrolytes. Preferably, the lithium-ion permeable filler material is electrochemically stable at <0.1 V vs. Li/Li$^+$.

Optionally the coating may comprise a conductive carbon coating. Suitably a conductive carbon coating may be obtained by a chemical vapour deposition (CVD) method. CVD is a well-known methodology in the art and comprises the thermal decomposition of a volatile carbon-containing gas (e.g. ethylene) onto the surface of the particulate material. Alternatively, the carbon coating may be formed by depositing a solution of a carbon-containing compound onto the surface of the particulate material followed by pyrolysis. The conductive carbon coating is sufficiently permeable to allow lithium access to the interior of the composite particles without excessive resistance, so as not to reduce the rate performance of the composite particles. For instance, the thickness of the carbon coating may suitably be in the range from 2 to 30 nm. Optionally, the carbon coating may be porous and/or may only cover partially the surface of the composite particles.

Alternatively, the coating may comprise a lithium-ion permeable solid electrolyte. Examples of suitable lithium permeable solid electrolytes include: garnet-type solid electrolytes (including "LLZO" electrolytes such as Li$_7$La$_3$Zr$_2$O$_{12}$ and Li$_{6.5}$La$_3$Ti$_{0.5}$Zr$_{1.5}$O$_{12}$); perovskite-type solid electrolytes (including "LLTO" electrolytes such as Li$_{0.33}$La$_{0.57}$TiO$_3$); LISICON-type solid electrolytes, NaSICON-type solid electrolytes (such as Li$_{1.3}$Al$_{0.3}$Ti$_{1.7}$(PO$_4$)$_3$); lithium phosphorous oxy-nitride (LiPON) solid electrolytes; Li$_3$N-type solid electrolytes; lithium phosphate (Li$_3$PO$_4$) solid electrolytes, lithium titanate (Li$_4$Ti$_5$O$_{12}$) solid electrolytes; lithium tantalate (LiTaO$_3$) solid electrolytes; sulfide-type solid electrolytes; argyrodite-type solid electrolytes; and anti-perovskite-type solid electrolytes. Variants (e.g. including dopants) and combinations of these electrolyte types are also included.

A coating has the advantages that it further reduces the BET surface area of the particulate material by smoothing any surface defects and by filling any remaining surface microporosity, thereby further reducing first cycle loss. The use of electronically conductive coatings, such as a carbon coating, is particularly advantageous as it improves the conductivity of the surface of the composite particles, improving the rate performance of the particulate material when used as electroactive materials in lithium-ion batteries, and/or reducing the need for conductive additives in electrode compositions, and also creates an improved surface for the formation of a stable SEI layer, resulting in improved capacity retention on cycling. In the case that the composite particles comprise a coating, the silicon content of the particles in wt % is determined based on the weight of the particles including the coating.

The composite particles of the invention are suitably prepared via chemical vapor infiltration (CVI) of a silicon-containing precursor into the pore structure of the porous carbon framework. As used herein, CVI refers to processes in which a gaseous silicon-containing precursor is thermally decomposed on a surface to form elemental silicon at the surface and gaseous by-products.

According to a second aspect of the invention, there is provided a process for preparing silicon-containing composite particles, the process comprising the steps of:
(a) providing a plurality of porous carbon particles comprising micropores and/or mesopores, wherein:
    (i) the micropores and mesopores have a total pore volume as measured by gas adsorption of P$^1$ cm$^3$/g, wherein P$^1$ represents a natural number having a value of from 0.5 to 1.5,
    (ii) the PD$_{90}$ pore diameter is at least 3 nm and less 12 nm; and
    (iii) the micropore volume fraction based on P$^1$ is from 0.43 to 0.85;
(b) contacting the plurality of porous carbon particles with a gas comprising 0.5 to 20 vol % of a silicon precursor gas at a temperature from 400 to 700° C.

The process of the second aspect of the invention may be used to prepare the particulate material of the first aspect of the invention.

Suitable gaseous silicon-containing precursors include silane (SiH$_4$), silane derivatives (e.g. disilane, trisilane and tetrasilane), and trichlorosilane (SiHCl$_3$). The silicon-containing precursors may be used either in pure form or more usually as a diluted mixture with an inert carrier gas, such as nitrogen or argon. The silicon-containing precursor is used in an amount in the range from 0.5-20 vol %, for instance from 1-10 vol %, or 1-5 vol %, preferably at least 3 vol %, based on the total volume of the silicon-containing precursor and the inert carrier gas. The CVI process is suitably carried out at low partial pressure of silicon precursor with total pressure of 101.3 kPa (i.e. 1 atm), the remaining partial pressure made up to atmospheric pressure using an inert padding gas such as hydrogen, nitrogen or argon. Deposition temperatures ranging from 400-700° C. are used, preferably from 425-550° C., or 425-500° C. When the CVI process is carried out on a large scale it is preferably performed with agitation or fluidization of the porous carbon particles. Suitable reactor types include a rotary kiln, or fluidized bed reactor (including spouted bed reactor).

In order to obtain the particulate material of the invention with a high content of surface silicon, it is necessary that the CVI process be carefully controlled to ensure that the rate of silicon deposition is low relative to the rate of diffusion of the silicon precursor gas into the pore structure of the porous carbon framework. Operation in the preferred temperature range of 425-500° C. and the use of a low concentration of the silicon precursor gas can also control the rate of silicon deposition, ensuring that the rate of silicon deposition is low relative to the infiltration rate of the silicon precursor. The conditions within the CVI reactor should also be as homogenous as possible. Agitation or fluidization of the porous carbon particles ensures that the silicon precursor gas is able to infiltrate the particles uniformly and also ensures that the temperature in the reactor is homogenous throughout the particle bed.

As an example of a fixed-bed reactor method (experimental scale), 1.8 g of a particulate porous framework was placed on a stainless-steel plate at a constant thickness of 1 mm along its length. The plate was then placed inside a stainless-steel tube of outer diameter 60 mm with gas inlet and outlet lines located in the hot zone of a retort furnace. The furnace tube was purged with nitrogen gas for 30 minutes at room temperature, then the sample temperature was increased to 450-500° C. The nitrogen gas flow-rate is adjusted to ensure a gas residence time of at least 90 seconds in the furnace tube and maintained at that rate for 30 minutes. Then, the gas supply is switched from nitrogen to a mixture of monosilane in nitrogen at 1.25 vol. % concentration. Dosing of monosilane is performed over a 5-hour period with a reactor pressure maintained at 101.3 kPa (1 atm). After dosing has finished the gas flow rate is kept constant whilst the silane is purged from the furnace using nitrogen. The furnace is purged for 30 minutes under nitrogen before being cooled down to room temperature over several hours. The atmosphere is then switched over to air gradually over a period of two hours by switching the gas flow from nitrogen to air from a compressed air supply.

As an example of a fluidized bed reactor method (production scale), 50 g of a particulate porous carbon framework was placed in a fluidized bed reactor fabricated with a 0.95 cm (⅜") stainless steel gas inlet, a 60 mm outside diameter (O.D.) tubular section with length of 520 mm, and a stainless steel expanded head with an O.D. of 100 mm. The reactor was suspended from a frame and a vertically-oriented tube furnace was positioned such that the hot zone ran from the conical section to ¾ of the length of the cylindrical section (approx. 380 mm long). The minimum fluidization velocity was determined with a cold-flow pressure-drop test with nitrogen as an inert gas, ramping gas flow rate between 1 to 2.5 L/min. Once minimum fluidizing velocity was determined, the inert gas flow rate was held constant at or above the minimum fluidizing velocity. The furnace was ramped to the desired reaction temperature under constant inert gas flow rate. After stabilizing at a target temperature between 435-500° C., the fluidizing gas was switched from pure nitrogen to 1.25 vol % monosilane in nitrogen. The reaction progress was monitored by measuring pressure drop and furnace temperature difference between top and bottom. The gas flow rate was adjusted throughout the run to maintain a pressure drop consistent with continued fluidization and minimum temperature difference between the top and bottom of the bed of less than 40° C. was maintained. After 12 hours, the fluidizing gas was then switched to pure nitrogen whilst maintaining fluidisation, this purge lasted 30 minutes. Then the furnace was ramped to ambient temperature over several hours. On reaching ambient temperature, the furnace atmosphere was switched to air gradually over a period of hours.

In a third aspect of the invention, there is provided a composition comprising a particulate material according to the first aspect of the invention and at least one other component. In particular, there is provided a composition comprising a particulate material according to the first aspect of the invention and at least one other component selected from: (i) a binder; (ii) a conductive additive; and (iii) an additional particulate electroactive material. The composition according to the third aspect of the invention is useful as an electrode composition, and thus may be used to form the active layer of an electrode.

The particulate material used to prepare the composition of the third aspect of the invention may have any of the features described as preferred or optional with regard to the first aspect of the invention.

The composition may be a hybrid electrode composition that comprises a particulate material according to the first aspect of the invention and at least one additional particulate electroactive material. Examples of additional particulate electroactive materials include graphite, hard carbon, silicon, tin, germanium, aluminium and lead. The at least one additional particulate electroactive material is preferably selected from graphite and hard carbon, and most preferably the at least one additional particulate electroactive material is graphite.

In the case of a hybrid electrode composition, the composition preferably comprises from 3 to 60 wt %, or from 3 to 50 wt %, or from 5 to 50 wt %, or from 10 to 50 wt %, or from 15 to 50 wt %, of the particulate material according to the first aspect of the invention, based on the total dry weight of the composition.

The at least one additional particulate electroactive material is suitably present in an amount of from 20 to 95 wt %, or from 25 to 90 wt %, or from 30 to 750 wt % of the at least one additional particulate electroactive material.

The at least one additional particulate electroactive material preferably has a $D_{50}$ particle diameter in the range from 10 to 50 μm, preferably from 10 to 40 μm, more preferably from 10 to 30 μm and most preferably from 10 to 25 μm, for example from 15 to 25 μm.

The $D_{10}$ particle diameter of the at least one additional particulate electroactive material is preferably at least 5 μm, more preferably at least 6 μm, more preferably at least 7 μm, more preferably at least 8 μm, more preferably at least 9 μm, and still more preferably at least 10 μm.

The $D_{90}$ particle diameter of the at least one additional particulate electroactive material is preferably up to 100 μm, more preferably up to 80 μm, more preferably up to 60 μm, more preferably up to 50 μm, and most preferably up to 40 μm.

The at least one additional particulate electroactive material is preferably selected from carbon-comprising particles, graphite particles and/or hard carbon particles, wherein the graphite and hard carbon particles have a $D_{50}$ particle diameter in the range from 10 to 50 μm. Still more preferably, the at least one additional particulate electroactive material is selected from graphite particles, wherein the graphite particles have a $D_{50}$ particle diameter in the range from 10 to 50 μm.

The composition may also be a non-hybrid (or "high loading") electrode composition that is substantially free of additional particulate electroactive materials. In this context, the term "substantially free of additional particulate electroactive materials" should be interpreted as meaning that the composition comprises less than 15 wt %, preferably less than 10 wt %, preferably less than 5 wt %, preferably less than 2 wt %, more preferably less than 1 wt %, more preferably less than 0.5 wt % of any additional electroactive materials (i.e. additional materials that are capable of inserting and releasing metal ions during the charging and discharging of a battery), based on the total dry weight of the composition.

A "high-loading" electrode composition of this type preferably comprises at least 50 wt %, or at least 60 wt %, or at least 70 wt %, or at least 80 wt %, or at least 90 wt % of the particulate material according to the first aspect of the invention, based on the total dry weight of the composition.

The composition may optionally comprise a binder. A binder functions to adhere the composition to a current collector and to maintain the integrity of the composition. Examples of binders that may be used in accordance with the present invention include polyvinylidene fluoride (PVDF), polyacrylic acid (PAA) and alkali metal salts thereof, modified polyacrylic acid (mPAA) and alkali metal salts thereof, carboxymethylcellulose (CMC), modified carboxymethylcellulose (mCMC), sodium carboxymethylcellulose (Na-CMC), polyvinylalcohol (PVA), alginates and alkali metal salts thereof, styrene-butadiene rubber (SBR) and polyimide. The composition may comprise a mixture of binders. Preferably, the binder comprises polymers selected from polyacrylic acid (PAA) and alkali metal salts thereof, and modified polyacrylic acid (mPAA) and alkali metal salts thereof, SBR and CMC.

The binder may suitably be present in an amount of from 0.5 to 20 wt %, preferably 1 to 15 wt %, preferably 2 to 10 wt % and most preferably 5 to 10 wt %, based on the total dry weight of the composition.

The binder may optionally be present in combination with one or more additives that modify the properties of the binder, such as cross-linking accelerators, coupling agents and/or adhesive accelerators.

The composition may optionally comprise one or more conductive additives. Preferred conductive additives are non-electroactive materials that are included so as to improve electrical conductivity between the electroactive components of the composition and between the electroactive components of the composition and a current collector. The conductive additives may suitably be selected from carbon black, carbon fibers, carbon nanotubes, graphene, acetylene black, ketjen black, metal fibers, metal powders and conductive metal oxides. Preferred conductive additives include carbon black and carbon nanotubes.

The one or more conductive additives may suitably be present in a total amount of from 0.5 to 20 wt %, preferably 1 to 15 wt %, preferably 2 to 10 wt % and most preferably 5 to 10 wt %, based on the total dry weight of the composition.

In a fourth aspect, the invention provides an electrode comprising a particulate material as defined with reference to the first aspect of the invention in electrical contact with a current collector. The particulate material used to prepare the electrode of the fourth aspect of the invention may have any of the features described as preferred or optional with regard to the first aspect of the invention.

As used herein, the term current collector refers to any conductive substrate that is capable of carrying a current to and from the electroactive particles in the composition. Examples of materials that can be used as the current collector include copper, aluminium, stainless steel, nickel, titanium and sintered carbon. Copper is a preferred material. The current collector is typically in the form of a foil or mesh having a thickness of between 3 to 500 µm. The particulate materials of the invention may be applied to one or both surfaces of the current collector to a thickness that is preferably in the range from 10 µm to 1 mm, for example from 20 to 500 µm, or from 50 to 200 µm.

Preferably, the electrode comprises a composition as defined with reference to the third aspect of the invention in electrical contact with a current collector. The composition may have any of the features described as preferred or optional with regard to the third aspect of the invention.

The electrode of the fourth aspect of the invention may suitably be fabricated by combining the particulate material of the invention (optionally in the form of the composition of the invention) with a solvent and optionally one or more viscosity modifying additives to form a slurry. The slurry is then cast onto the surface of a current collector and the solvent is removed, thereby forming an electrode layer on the surface of the current collector. Further steps, such as heat treatment to cure any binders and/or calendaring of the electrode layer may be carried out as appropriate. The electrode layer suitably has a thickness in the range from 20 µm to 2 mm, preferably 20 µm to 1 mm, preferably 20 µm to 500 µm, preferably 20 µm to 200 µm, preferably 20 µm to 100 µm, preferably 20 µm to 50 µm.

Alternatively, the slurry may be formed into a freestanding film or mat comprising the particulate material of the invention, for instance by casting the slurry onto a suitable casting template, removing the solvent and then removing the casting template. The resulting film or mat is in the form of a cohesive, freestanding mass that may then be bonded to a current collector by known methods.

The electrode of the fourth aspect of the invention may be used as the anode of a metal-ion battery. Thus, in a fifth aspect, the present invention provides a rechargeable metal-ion battery comprising an anode, the anode comprising an electrode as described above, a cathode comprising a cathode active material capable of releasing and reabsorbing metal ions; and an electrolyte between the anode and the cathode.

The metal ions are preferably lithium ions. More preferably the rechargeable metal-ion battery of the invention is a lithium-ion battery, and the cathode active material is capable of releasing and accepting lithium ions.

The cathode active material is preferably a metal oxide-based composite. Examples of suitable cathode active materials include $LiCoO_2$, $LiCo_{0.99}Al_{0.01}O_2$, $LiNiO_2$, $LiMnO_2$, $LiCo_{0.5}Ni_{0.5}O_2$, $LiCo_{0.7}Ni_{0.3}O_2$, $LiCo_{0.8}Ni_{0.2}O_2$, $LiCo_{0.82}Ni_{0.18}O_2$, $LiCo_{0.8}Ni_{0.15}Al_{0.05}O_2$, $LiNi_{0.4}Co_{0.3}Mn_{0.3}O_2$ and $LiNi_{0.33}Co_{0.33}Mn_{0.34}O_2$. The cathode current collector is generally of a thickness of between 3 to 500 µm. Examples of materials that can be used as the cathode current collector include aluminium, stainless steel, nickel, titanium and sintered carbon.

The electrolyte is suitably a non-aqueous electrolyte containing a metal salt, e.g. a lithium salt, and may include, without limitation, non-aqueous electrolytic solutions, solid electrolytes and inorganic solid electrolytes. Examples of non-aqueous electrolyte solutions that can be used include non-protic organic solvents such as propylene carbonate, ethylene carbonate, butylene carbonates, dimethyl carbonate, diethyl carbonate, gamma butyrolactone, 1,2-dimethoxyethane, 2-methyltetrahydrofuran, dimethylsulfoxide, 1,3-dioxolane, formamide, dimethylformamide, acetonitrile, nitromethane, methylformate, methyl acetate, phosphoric acid triesters, trimethoxymethane, sulfolane, methyl sulfolane and 1,3-dimethyl-2-imidazolidinone.

Examples of organic solid electrolytes include polyethylene derivatives polyethyleneoxide derivatives, polypropylene oxide derivatives, phosphoric acid ester polymers, polyester sulfide, polyvinylalcohols, polyvinylidine fluoride and polymers containing ionic dissociation groups.

Examples of inorganic solid electrolytes include nitrides, halides and sulfides of lithium salts such as $Li_5NI_2$, $Li_3N$, $LiI$, $LiSiO_4$, $Li_2SiS_3$, $Li_4SiO_4$, $LiOH$ and $Li_3PO_4$.

The lithium salt is suitably soluble in the chosen solvent or mixture of solvents. Examples of suitable lithium salts include LiCl, LiBr, LiI, LiClO$_4$, LiBF$_4$, LiBC$_4$O$_8$, LiPF$_6$, LiCF$_3$SO$_3$, LiAsF$_6$, LiSbF$_6$, LiAlCl$_4$, CH$_3$SO$_3$Li and CF$_3$SO$_3$Li.

Where the electrolyte is a non-aqueous organic solution, the metal-ion battery is preferably provided with a separator interposed between the anode and the cathode. The separator is typically formed of an insulating material having high ion permeability and high mechanical strength. The separator typically has a pore diameter of between 0.01 and 100 μm and a thickness of between 5 and 300 μm. Examples of suitable electrode separators include a micro-porous polyethylene film.

The separator may be replaced by a polymer electrolyte material and in such cases the polymer electrolyte material is present within both the composite anode layer and the composite cathode layer. The polymer electrolyte material can be a solid polymer electrolyte or a gel-type polymer electrolyte.

EXAMPLES

Porous carbon frameworks C1 to C13 used in the following examples have the characteristics set out in Table 1.

purged for 30 minutes under nitrogen before being cooled down to room temperature over several hours. The atmosphere is then switched over to air gradually over a period of two hours by switching the gas flow from nitrogen to air from a compressed air supply.

Example 2: Determination of Surface Silicon Content

A series of samples of composite particles with varying amounts of deposited silicon (varying between 20 and 60 wt %) were made using the method of Example 1 using each of the carbons mentioned in Table 1. The Surface Silicon was calculated from the TGA curve for each sample. Table 2 provides the mean, maximum and minimum values of the Surface Silicon for the group of samples made with each carbon. It can be seen that very small or negligible amounts of Surface Silicon could be achieved using carbons C1, C10 and C13 whilst good levels of Surface Silicon could be consistently achieved across all samples with carbons C3, C4, C5, C7, C8 and C9. Varying levels of Surface Silicon were obtained with the other carbons.

TABLE 1

| Carbon No. | $D_{50}$ μm | $P^1$ cm$^3$/g | BET m$^2$/g | $PD_{10}$ nm | $PD_{30}$ nm | $PD_{50}$ nm | $PD_{75}$ nm | $PD_{90}$ nm | VP2* vol % | VP5* vol % | VP10* vol % | VP20* vol % | Micro-pore volume cm$^3$/g |
|---|---|---|---|---|---|---|---|---|---|---|---|---|---|
| C1** | 7.0 | 0.36 | 943 | — | 0.58 | 0.65 | 0.934 | 1.45 | 90.3 | 93.5 | 98.2 | 99.3 | 0.33 |
| C2 | 8.2 | 0.97 | 2338 | 0.59 | 0.78 | 0.94 | 2.16 | 2.96 | 70.3 | 94.1 | 97.3 | 98.7 | 0.68 |
| C3 | 7.6 | 0.70 | 1645 | 0.56 | 0.78 | 1.01 | 2.18 | 3.56 | 69.6 | 94.1 | 96.6 | 96.6 | 0.49 |
| C4 | 5.8 | 0.79 | 1785 | 0.53 | 0.82 | 1.17 | 2.45 | 4.55 | 60.9 | 92.7 | 95.7 | 97.4 | 0.48 |
| C5 | 5.3 | 1.21 | 2467 | 0.82 | 1.34 | 1.89 | 3.16 | 4.90 | 51.1 | 91.2 | 95.9 | 97.8 | 0.62 |
| C6 | 2.9 | 0.76 | 1637 | 0.61 | 0.83 | 1.26 | 2.61 | 4.99 | 57.8 | 90.1 | 93.8 | 95.9 | 0.44 |
| C7 | 5.1 | 0.69 | 1568 | 0.59 | 0.77 | 0.99 | 2.19 | 4.99 | 69.7 | 90.2 | 95.0 | 97.4 | 0.48 |
| C8 | 3.1 | 0.88 | 1860 | 0.60 | 0.87 | 1.41 | 2.79 | 5.12 | 54.6 | 89.1 | 93.3 | 95.6 | 0.48 |
| C9 | 7.4 | 0.73 | 1599 | 0.58 | 0.82 | 1.19 | 2.65 | 6.12 | 58.9 | 88.8 | 93.0 | 96.1 | 0.43 |
| C10** | 11.9 | 0.53 | 1143 | 0.59 | 0.63 | 0.95 | 2.53 | 12.22 | 67.0 | 85.0 | 89.1 | 93.0 | 0.36 |
| C11** | 7.9 | 1.29 | 1911 | 0.96 | 1.36 | 3.53 | 10.65 | 19.07 | 41.5 | 55.3 | 73.4 | 91.1 | 0.53 |
| C12** | 3.4 | 0.59 | 1026 | 0.55 | 0.79 | 1.47 | 10.29 | 25.81 | 51.4 | 61.9 | 74.7 | 86.4 | 0.31 |
| C13** | | 0.76 | 1037 | 0.59 | 9.15 | 18.62 | 27.34 | 36.17 | 23.1 | 24.3 | 31.6 | 54.1 | 0.18 |

*VP2 is the micropore volume fraction based on $P^1$, VP5, VP10 and VP20 represent respectively the fractional volume of pores having diameter up to 5 nm, 10 nm and 20 nm, based on $P^1$.
**Carbons C1 and C10 to C13 are comparative examples Example 1: Preparation of the Particulate Material in a Static Furnace Silicon-carbon composite particles were prepared by placing 1.8 g of a particulate porous framework with the properties listed in Table 1 on a stainless-steel plate at a constant thickness of 1 mm along its length. The plate was then placed inside a stainless-steel tube of outer diameter 60 mm with gas inlet and outlet lines located in the hot zone of a retort furnace. The furnace tube was purged with nitrogen gas for 30 minutes at room temperature, then the sample temperature was increased to between 450 and 475° C. The nitrogen gas flow-rate is adjusted to ensure a gas residence time of at least 90 seconds in the furnace tube and maintained at that rate for 30 minutes. Then, the gas supply is switched from nitrogen to a mixture of monosilane in nitrogen at 1.25 vol % concentration. Dosing of monosilane is performed over a period of up to 5-hours with a reactor pressure maintained at 101.3 kPa (1 atm). After dosing has finished the gas flow rate is kept constant whilst the silane is purged from the furnace using nitrogen. The furnace is

TABLE 2

| Carbon Ref | Mean of Surface Silicon between 20-60 wt % Si (wt %) | Maximum value of Surface Silicon (wt %) | Minimum value of Surface Silicon (wt %) |
|---|---|---|---|
| C1* | 0 | 0 | 0 |
| C2 | 18 | 30 | 10 |
| C3 | 30 | 38 | 22 |
| C4 | 36 | 40 | 33 |
| C5 | 35 | 46 | 24 |
| C7 | 38 | 43 | 34 |
| C8 | 43 | 45 | 39 |
| C9 | 29 | 36 | 26 |
| C10* | <3 | 3 | 0 |
| C11* | 19 | 25 | 16 |
| C12* | 20 | 24 | 17 |
| C13* | 5 | 8 | 2 |

*Comparative samples

Example 3: Preparation of Particulate Materials in a Fluidized Bed Reactor

Silicon-carbon composite particles were prepared in a vertical bubble-fluidized bed reactor comprising an 83 mm internal diameter stainless steel cylindrical vessel. A 250 g quantity of a powder of carbon framework particles with the properties listed in Table 1 is placed in the reactor. An inert gas (nitrogen) at a low flow rate is injected into the reactor to remove any oxygen. The reactor is then heated to a reaction temperature between 430 and 500° C. and 4% v/v monosilane gas diluted in nitrogen is supplied to the bottom of the reactor at a flow rate sufficient to fluidize the carbon framework particles, for a length of time sufficient to deposit the target mass of silicon. The reactor is purged for 30 minutes under nitrogen before being cooled down to room temperature over several hours. The atmosphere is then switched over to air gradually over a period of two hours by switching the gas flow from nitrogen to air from a compressed air supply.

Particulate materials S1, S2 and S4 to S8 of Table 3 were prepared using the method of Example 3.

Example 4: Carbon Coating

A mass of composite particles made using the method of Example 3 were placed into a stainless-steel tube loaded into a rotary furnace tube and sealed. The reactor space was purged with nitrogen at 0.2 L/min for 30 min. The furnace temperature was ramped up to 675° C. under nitrogen flow. A measured amount of styrene was placed in a Dreschel bottle and heated in a water bath, up to 75° C. After 10 minutes of furnace temperature stabilisation, styrene was allowed to flow into the reactor tube for 90 minutes by bubbling nitrogen of 2 L/min into the Dreschel bottle. The reactor is then purged with nitrogen and cooled down to ambient temperature under nitrogen, resulting in a carbon coated material.

Particulate material S3 of Table 3 was prepared according to the method of Example 3 and then carbon coated using the method of Example 4.

Example 5: Calculation of Surface Silicon and Coarse Bulk Silicon

The procedure used to calculate the surface silicon and coarse bulk silicon for the composite materials of the examples was as follows. 10-20 mg of the sample under test was loaded into a 70 μL crucible. The sample was loaded into a Mettler Toledo TGA/DSC 3+ instrument with an Ar purge gas, $N_2$ padding gas and air reaction gas at 100 mL/min. The TGA furnace chamber was ramped from 25 to 1400° C. at a rate of 10° C./min. Data was collected at 1 s intervals. FIG. 1 is a TGA plot for a sample of material S1 from Table 3 and FIG. 2 is a plot for a sample of material S7 from Table 3. The values for Coarse Bulk Silicon and Surface Silicon were extracted by finding the maximum mass (in mg) measured in the temperature range between 550° C. and 650° C. (labelled c), the final ash mass (labelled e), the minimum mass below 500° C. after volatile loss (labelled b) and the mass at 800° C. (labelled d). The formulas outlined above are used to calculate the Surface Silicon (Y) and Bulk Coarse Silicon (Z) values.

TABLE 3

| Sample | Carbon No. | $D_{50}$ (μm) | BET ($m^2$/g) | Si wt % | C wt % | O wt % | Si:C | Surface Silicon (wt %) | Coarse Bulk Silicon (wt %) |
|---|---|---|---|---|---|---|---|---|---|
| S1 | C6 | 3.3 | 134 | 51.6 | 43.1 | 6.1 | 1.2 | 40 | 1.7 |
| S2 | C6 | 3.6 | 80 | 53.9 | 41.8 | 5.2 | 1.2 | 36 | 6.7 |
| S3‡ | C6 | 3.5 | 8.7 | 49 | 44.7 | 6.6 | 1.1 | 35 | 5.5 |
| S4 | C8 | 3.1 | 90 | 53.3 | 41.4 | 3.8 | 1.3 | 30 | 6.9 |
| S5 | C6 | 3.2 | 103 | 54.6 | 41.6 | 4.3 | 1.3 | 29 | 4.8 |
| S6 | C6 | 3.0 | 107 | 56.8 | 42.2 | 3.6 | 1.4 | 22 | 9.9 |
| S7* | C8 | 3.4 | 247 | 49.4 | 44 | 4.9 | 1.1 | 14 | 11.2 |
| S8* | C8 | 3.8 | 298 | 53.9 | 44.8 | 2.5 | 1.2 | 6 | 13.3 |

*Comparative samples
‡Sample S3 was carbon coated in accordance with the method of Example 4

Comparative samples S7 and S8 demonstrate the importance of carefully controlled conditions in the FBR reaction. In comparative sample S7, an interruption in supply of the fluidizing gas caused de-fluidisation of the particles in the reactor bed and the formation of zones of excessive temperature within the reactor, resulting in a reduction of silicon infiltration and an increase in silicon deposition on the surfaces of the porous carbon framework (as indicated by the increase coarse silicon measurement). In comparative example S8, the temperature of the FBR reaction was varied such that the reaction was partly carried out below 400° C. Without being bound by theory, it is believed that silicon deposition into micropores is kinetically favoured at temperatures above 400° C., and particularly above 425° C., but that lower temperatures result in increased deposition of silicon onto the external surfaces of the porous carbon scaffolds.

Example 6: Preparation of Test Cells

Negative electrode coatings (anodes) were prepared using the Si—C composite materials of Table 3 and tested in full coin cells. To make the electrodes, a dispersion of carbon black in CMC binder was mixed in a Thinky™ mixer. The Si—C composite material was added to the mixture and mixed for 30 min in the Thinky™ mixer. SBR binder was then added to give a CMC:SBR ratio of 1:1, yielding a slurry with a weight ratio of Si—C composite material: CMC/SBR:carbon black of 70%:16%:14%. The slurry was further mixed for 30 min in the Thinky™ mixer, then was coated onto a 10 μm thick copper substrate (current collector) and dried at 50° C. for 10 minutes, followed by further drying at 110° C. for 12 hours to form a negative electrode with a coating density of 0.7±0.5 g/$cm^3$.

Full coin cells were made using circular negative electrodes of 0.8 cm radius cut from the negative electrodes with a porous polyethylene separator and a nickel manganese cobalt (NMC532) positive electrode. The positive and negative electrodes were designed to form a balanced pair, such that the capacity ratio of the positive to negative electrodes was 0.9. An electrolyte comprising 1M LiPF$_6$ in a solution of fluoroethylene carbonate, ethylene carbonate and ethyl methyl carbonate containing 3 wt % vinylene carbonate was then added to the cell before sealing.

The coin cells were cycled as follows: A constant current was applied at a rate of C/25, to lithiate the anode, with a cut off voltage of 4.3 V. When the cut off was reached, a constant voltage of 4.3 V is applied until a cut off current of C/100 is reached. The cell was then rested for 10 minutes in the lithiated state. The anode is then delithiated at a constant current of C/25 with a cut off voltage of 2.75 V. The cell was then rested for 10 minutes. After this initial cycle, a constant current of C/2 was applied to lithiate the anode with a 4.3 V cut off voltage, followed by a 4.3 V constant voltage with a cut off current of C/40 with rest time of 5 minutes. The anode was then delithiated at a constant current of C/2 with a 2.75V cut off. This was then repeated for the desired number of cycles. The capacity retention at 100 cycles (CR100) and 500 cycles (CR500) was calculated and is given in Table 4 along with the 1st lithiation capacity, the 1st delithiation capacity and the first cycle loss (FCL).

The charge (lithiation) and discharge (delithiation) capacities for each cycle are calculated per unit mass of the silicon-carbon composite material and the capacity retention value is calculated for each discharge capacity as a percentage of the discharge capacity on the second cycle. The first cycle loss (FCL) is $(1-(1^{st}$ delithiation capacity/$1^{st}$ lithiation capacity))×100%. The values in Table 4 are averaged over 3 coin cells for each material.

TABLE 4

Electrochemical Data

| Sample | 1st lith. mAh/g | 1st delith. mAh/g | FCL % | CR100 % | CR500 % |
|---|---|---|---|---|---|
| S1 | 2015 | 1497 | 25.7 | 91 | 73 |
| S3 | 1848 | 1379 | 25.4 | 87 | 60 |
| S4 | 2138 | 1685 | 21.2 | 84 | 50 |
| S5 | 2023 | 1558 | 23 | 90 | 61 |
| S6 | 2187 | 1737 | 20.6 | 85 | 45 |
| S7* | 2091 | 1508 | 27.9 | 82 | |
| S8* | 2197 | 1634 | 25.6 | 76 | |

*Comparative samples

Additional aspects of the disclosure are provided by the following enumerated embodiments, which may be combined in any number and in any fashion not logically or technically inconsistent:

Embodiment 1

A particulate material consisting of a plurality of composite particles, wherein the composite particles comprise:
(a) a porous carbon framework comprising micropores and mesopores,
wherein the micropores and mesopores have a total pore volume as measured by gas adsorption of $P^1$ cm$^3$/g, wherein $P^1$ represents a natural number having a value of from 0.5 to 1.5,
wherein the PD$_{90}$ pore diameter is at least 3 nm and less than 12 nm; and wherein the micropore volume fraction based on $P^1$ is from 0.43 to 0.85; and
(b) a plurality of nanoscale elemental silicon domains located within the pores of the porous carbon framework,
wherein the particulate material comprises from 25 to 65 wt % silicon, and wherein at least 20 wt % of the silicon is surface silicon as determined by thermogravimetric analysis (TGA).

Embodiment 2

A particulate material according to embodiment 1, wherein $P^1$ has a value of at least 0.55, or at least 0.6, or at least 0.65, or at least 0.7.

Embodiment 3

A particulate material according to embodiment 1 or embodiment 2, wherein $P^1$ has a value of no more than 1.4, or no more than 1.3, or no more than 1.2, or no more than 1.1, or no more than 1.

Embodiment 4

A particulate material according to any preceding embodiment, wherein the PD$_{90}$ pore diameter of the porous carbon framework is no more than 10 nm, or no more than 8 nm, or no more than 6 nm.

Embodiment 5

A particulate material according to any preceding embodiment, wherein the PD$_{90}$ pore diameter of the porous carbon framework is at least 3.2 nm, or at least 3.5 nm, or at least 3.8 nm, or at least 4 nm.

Embodiment 6

A particulate material according to any preceding embodiment, wherein the PD$_{75}$ pore diameter of the porous carbon framework is no more than 10 nm, or no more than 8 nm, or no more than 6 nm, or no more than 4 nm.

Embodiment 7

A particulate material according to any preceding embodiment, wherein the PD$_{50}$ pore diameter of the porous carbon framework is no more than 2 nm, or no more than 1.9 nm, or no more than 1.8 nm, or no more than 1.7 nm, or no more than 1.6 nm.

Embodiment 8

A particulate material according to any preceding embodiment, wherein the PD$_{50}$ pore diameter of the porous carbon framework is at least 1 nm, or at least 1.1 nm, or at least 1.2 nm.

Embodiment 9

A particulate material according to any preceding embodiment, wherein the PD$_{30}$ pore diameter of the porous carbon framework is no more than 1.6 nm, or no more than 1.5 nm, or no more than 1.4 nm, or no more than 1.3 nm, or no more than 1.2 nm, or no more than 1.1 nm, or no more than 1 nm.

Embodiment 10

A particulate material according to any preceding embodiment, wherein the $PD_{30}$ pore diameter of the porous carbon framework is at least 0.6 nm, or at least 0.7 nm.

Embodiment 11

A particulate material according to any preceding embodiment, wherein the micropore volume fraction of the porous carbon framework is at least 0.45, or at least 0.48, or at least 0.5, or at least 0.52, or at least 0.54, or at least 0.56, or at least 0.58, or at least 0.6 based on the total volume of micropores and mesopores.

Embodiment 12

A particulate material according to any preceding embodiment, wherein the micropore volume fraction of the porous carbon framework is no more than 0.8, or no more than 0.79, or no more than 0.78, or no more than 0.76, or no more than 0.74, or no more than 0.72, or no more than 0.7, based on the total volume of micropores and mesopores.

Embodiment 13

A particulate material according to any preceding embodiment, wherein the total volume of micropores in the porous carbon framework is at least 0.36 $cm^3/g$, or at least 0.38 $cm^3/g$, at least 0.40 $cm^3/g$, at least 0.42 $cm^3/g$.

Embodiment 14

A particulate material according to any preceding embodiment, wherein the fractional volume of pores having a pore size of 5 nm or less is at least 0.8, or at least 0.82, or at least 0.84, or at least 0.86, or at least 0.88, or at least 0.9.

Embodiment 15

A particulate material according to any preceding embodiment, wherein the fractional volume of pores having a pore size of 10 nm or less is at least 0.9, or at least 0.92, or at least 0.94, or at least 0.96.

Embodiment 16

A particulate material according to any preceding embodiment, wherein the fractional volume of pores having a pore size of 20 nm or less is at least 0.94, or at least 0.96, or at least 0.98.

Embodiment 17

A particulate material according to any preceding embodiment, wherein the porous carbon framework has a bimodal or multimodal pore size distribution.

Embodiment 18

A particulate material according to any preceding embodiment, wherein the total volume of pores having a diameter in the range of from greater than 50 nm to 100 nm is defined as $P^2$ $cm^3/g$, wherein $P^2$ is no more than $0.2 \times P^1$, or no more than $0.1 \times P^1$, or no more than $0.05 \times P^1$, or no more than $0.02 \times P^1$, or no more than $0.01 \times P^1$, or no more than $0.005 \times P^1$.

Embodiment 19

A particulate material according to any preceding embodiment, wherein the porous carbon framework has a BET surface area from 1200 to 3000 $m^2/g$.

Embodiment 20

A particulate material according to any preceding embodiment, comprising at least 26 wt %, or at least 28 wt %, or at least 30 wt %, or at least 32 wt % silicon, or at least 34 wt % silicon, or at least 36 wt % silicon, or at least 38 wt % silicon, or at least 40 wt % silicon, or at least 42 wt % silicon, or at least 44 wt % silicon.

Embodiment 21

A particulate material according to any preceding embodiment, comprising no more than 60 wt % silicon, no more than 58 wt % silicon, or no more than 56 wt % silicon, or no more than 54 wt % silicon, or no more than 52 wt % silicon, or no more than 50 wt % silicon.

Embodiment 22

A particulate material according to any preceding embodiment, wherein the porous carbon framework is a steam-activated porous carbon framework.

Embodiment 23

A particulate material according to any preceding embodiment, wherein the porous carbon framework comprises at least 80 wt % carbon, or at least 90 wt % carbon, or at least 95 wt % carbon, or at least 98 wt % carbon, or at least 99 wt % carbon.

Embodiment 24

A particulate material according to any preceding embodiment, wherein the weight ratio of silicon to the porous carbon framework is at least $0.50 \times P^1$, or at least $0.55 \times P^1$, or at least $0.6 \times P^1$, or at least $0.65 \times P^1$, or $0.7 \times P^1$, or at least $0.75 \times P^1$, or at least $0.8 \times P^1$, or at least $0.85 \times P^1$, or at least $0.9 \times P^1$, or at least $0.95 \times P^1$, or at least $1 \times P^1$.

Embodiment 25

A particulate material according to any preceding embodiment, wherein the weight ratio of silicon to the porous carbon framework is no more than $1.9 \times P^1$, or no more than $1.85 \times P^1$, or no more than $1.8 \times P^1$, or no more than $1.75 \times P^1$, or no more than $1.7 \times P^1$, or no more than $1.65 \times P^1$, or no more than $1.6 \times P^1$, or no more than $1.55 \times P^1$, or no more than $1.5 \times P^1$.

Embodiment 26

A particulate material according to any preceding embodiment, wherein at least 22 wt %, or at least 25 wt %, or at least 30 wt %, or at least 35 wt %, or at least 40 wt % of the silicon is surface silicon as determined by thermogravimetric analysis (TGA).

Embodiment 27

A particulate material according to any preceding embodiment, wherein no more than 10 wt % of the silicon, or no more than 8 wt % of the silicon, or no more than 6 wt % of the silicon, or no more than 5 wt % of the silicon is coarse bulk silicon as determined by thermogravimetric analysis (TGA).

Embodiment 28

A particulate material according to any preceding embodiment, wherein at least a portion of the micropores and/or mesopores comprise void space that is fully enclosed by the silicon.

Embodiment 29

A particulate material according to any preceding embodiment, wherein the composite particles have a $D_{50}$ particle diameter in the range of 1 to 30 μm.

Embodiment 30

A particulate material according to any preceding embodiment, wherein the composite particles have a $D_{10}$ particle diameter of at least 0.5 μm, or at least 0.8 μm, or at least 1 μm, or at least 1.5 μm, or at least 2 μm.

Embodiment 31

A particulate material according to any preceding embodiment, wherein the composite particles have a $D_{90}$ particle diameter of no more than 50 μm, or no more than 40 μm, or no more than 30 μm, or no more than 25 μm, or no more than 20 μm, or no more than 15 μm.

Embodiment 32

A particulate material according to any preceding embodiment, wherein the composite particles have a BET surface area of no more than 100 m$^2$/g, or no more than 80 m$^2$/g, or no more than 60 m$^2$/g, or no more than 50 m$^2$/g, or no more than 40 m$^2$/g, or no more than 30 m$^2$/g, or no more than 25 m$^2$/g, or no more than 20 m$^2$/g, or no more than 15 m$^2$/g, or no more than 10 m$^2$/g.

Embodiment 33

A particulate material according to any preceding embodiment, wherein the composite particles have a BET surface area of at least 0.1 m$^2$/g, or at least 1 m$^2$/g, or at least 2 m$^2$/g, or at least 5 m$^2$/g.

Embodiment 34

A particulate material according to any preceding embodiment, wherein the volume of micropores and mesopores of the composite particles, in the presence of silicon, as measured by nitrogen gas adsorption, is no more than $0.15 \times P^1$, or no more than $0.10 \times P^1$, or no more than $0.05 \times P^1$, or no more than $0.02 \times P^1$.

Embodiment 35

A particulate material according to any preceding embodiment, wherein the composite particles are obtained by chemical vapor infiltration (CVI) of a silicon-containing precursor into the pore structure of a porous carbon framework.

Embodiment 36

A composition comprising a particulate material as defined in any of embodiments 1 to 35 and at least one other component.

Embodiment 37

A composition according to embodiment 36, comprising at least one additional particulate electroactive material.

Embodiment 38

A composition according to embodiment 37, comprising from 20 to 70 wt %, or from 25 to 65 wt %, or from 30 to 60 wt % of the at least one additional particulate electroactive material.

Embodiment 39

A composition according to embodiment 37 or embodiment 38, comprising from 15 to 60 wt %, or from 20 to 50 wt %, or from 30 to 50 wt % of the particulate material as defined in any of embodiments 1 to 35, based on the total dry weight of the composition.

Embodiment 40

A composition according to any of embodiments 37 to 39, wherein the at least one additional particulate electroactive material is selected from graphite, hard carbon, silicon, tin, germanium, aluminium and lead.

Embodiment 41

A composition according to embodiment 36, wherein the composition is substantially free of additional particulate electroactive materials.

Embodiment 42

A composition according to embodiment 41, comprising at least 50 wt %, or at least 60 wt %, or at least 70 wt %, or at least 80 wt %, or at least 90 wt % of the particulate material as defined in any of embodiments 1 to 35, based on the total dry weight of the composition.

Embodiment 43

A composition according to any of embodiments 36 to 42, comprising a binder.

Embodiment 44

A composition according to embodiment 43, comprising from 0.5 to 20 wt %, or from 1 to 15 wt %, or from 2 to 10 wt %, or from 5 to 10 wt % of the binder, based on the total dry weight of the composition.

Embodiment 45

A composition according to any of embodiments 36 to 44, comprising one or more conductive additives.

Embodiment 46

A composition according to embodiment 45, comprising from 0.5 to 20 wt %, or from 1 to 15 wt %, or from 2 to 10 wt %, or from 5 to 10 wt % of the one or more conductive additives, based on the total dry weight of the composition.

Embodiment 47

An electrode comprising a particulate material as defined in any of embodiments 1 to 35 in electrical contact with a current collector.

Embodiment 48

An electrode according to embodiment 47, wherein the particulate material is in the form of a composition as defined in any of embodiments 36 to 46.

Embodiment 49

A rechargeable metal-ion battery comprising:
(i) an anode, wherein the anode comprises an electrode as described in embodiment 47 or embodiment 48;
(ii) a cathode comprising a cathode active material capable of releasing and reabsorbing metal ions; and
(iii) an electrolyte between the anode and the cathode.

Embodiment 50

A process for preparing composite particles, the process comprising the steps of:
(a) providing a plurality of porous carbon particles comprising micropores and/or mesopores, wherein:
  (i) the micropores and mesopores have a total pore volume as measured by gas adsorption of $P^1$ cm$^3$/g, wherein $P^1$ represents a natural number having a value of from 0.5 to 1.5;
  (ii) the PD$_{90}$ pore diameter is at least 3 nm and less 12 nm; and
  (iii) the micropore volume fraction based on $P^1$ is from 0.43 to 0.85;
(b) contacting the plurality of porous carbon particles with a gas comprising 0.5 to 20 vol % of a silicon precursor gas at a temperature from 400 to 700° C.

Embodiment 51

A process according to embodiment 50, wherein the composite particles are as defined in any of embodiments 1 to 35.

The invention claimed is:

1. A particulate material consisting of a plurality of composite particles, wherein the composite particles comprise:
(a) a porous carbon framework comprising micropores and mesopores,
   wherein the micropores and mesopores have a total pore volume as measured by gas adsorption of $P^1$ cm$^3$/g, wherein $P^1$ represents a natural number having a value of from 0.5 to 1.5,
   wherein the PD$_{90}$ pore diameter is at least 3 nm and less than 12 nm; and
   wherein the micropore volume fraction based on $P^1$ is from 0.43 to 0.85; and
(b) a plurality of nanoscale elemental silicon domains located within the pores of the porous carbon framework,
wherein the particulate material comprises from 25 to 65 wt % silicon, and wherein at least 20 wt % of the silicon is surface silicon as determined by thermogravimetric analysis (TGA).

2. A particulate material according to claim 1, wherein $P^1$ has a value of at least 0.65.

3. A particulate material according to claim 1, wherein $P^1$ has a value of no more than 1.3.

4. A particulate material according to claim 1, wherein the PD$_{90}$ pore diameter of the porous carbon framework is no more than 10 nm.

5. A particulate material according to claim 1, wherein the micropore volume fraction of the porous carbon framework is at least 0.5, based on the total volume of micropores and mesopores.

6. A particulate material according to claim 1, wherein the micropore volume fraction of the porous carbon framework is no more than 0.8, based on the total volume of micropores and mesopores.

7. A particulate material according to claim 1, wherein the total volume of micropores in the porous carbon framework is at least 0.36 cm$^3$/g.

8. A particulate material according to claim 1, wherein the fractional volume of pores having a pore size of 5 nm or less is at least 0.8.

9. A particulate material according to claim 1, wherein the total volume of pores having a diameter in the range of from greater than 50 nm to 100 nm is defined as $P^2$ cm$^3$/g, wherein $P^2$ is no more than $0.2 \times P^1$.

10. A particulate material according to claim 1, wherein the porous carbon framework has a BET surface area from 1200 to 3000 m$^2$/g.

11. A particulate material according to claim 1, comprising at least 30 wt % silicon.

12. A particulate material according to claim 1, comprising no more than 60 wt % silicon.

13. A particulate material according to claim 1, wherein the porous carbon framework is a steam-activated porous carbon framework.

14. A particulate material according to claim 1, wherein the porous carbon framework comprises at least 95 wt % carbon.

15. A particulate material according to claim 1, wherein the weight ratio of silicon to the porous carbon framework is at least $0.75 \times P^1$.

16. A particulate material according to claim 1, wherein the weight ratio of silicon to the porous carbon framework is no more than $1.9 \times P^1$.

17. A particulate material according to claim 1, wherein at least 30 wt % of the silicon is surface silicon as determined by thermogravimetric analysis (TGA).

18. A particulate material according to claim 1, wherein at least 40 wt % of the silicon is surface silicon as determined by thermogravimetric analysis (TGA).

19. A particulate material according to claim 1, wherein no more than 10 wt % of the silicon is coarse bulk silicon as determined by thermogravimetric analysis (TGA).

20. A particulate material according to claim 1, wherein no more than 5 wt % of the silicon is coarse bulk silicon as determined by thermogravimetric analysis (TGA).

21. A particulate material according to claim 1, wherein at least a portion of the micropores and/or mesopores comprise void space that is fully enclosed by the silicon.

22. A particulate material according to claim 1, wherein the volume of micropores and mesopores of the composite particles, in the presence of silicon, as measured by nitrogen gas adsorption, is no more than $0.15 \times P^1$.

23. A particulate material according to claim 1, wherein the composite particles are obtained by chemical vapor infiltration (CVI) of a silicon-containing precursor into the pore structure of a porous carbon framework.

24. An electrode comprising a particulate material as defined in claim 1 in electrical contact with a current collector.

25. A rechargeable metal-ion battery comprising:
  (i) an anode, wherein the anode comprises an electrode as described in claim 24;
  (ii) a cathode comprising a cathode active material capable of releasing and reabsorbing metal ions; and
  (iii) an electrolyte between the anode and the cathode.

26. A process for preparing composite particles, the process comprising the steps of:
  (a) providing a plurality of porous carbon particles comprising micropores and/or mesopores, wherein:
    (i) the micropores and mesopores have a total pore volume as measured by gas adsorption of $P^1$ cm$^3$/g, wherein $P^1$ represents a natural number having a value of from 0.5 to 1.5;
    (ii) the $PD_{90}$ pore diameter is at least 3 nm and less 12 nm; and
    (iii) the micropore volume fraction based on $P^1$ is from 0.43 to 0.85;
  (b) contacting the plurality of porous carbon particles with a gas comprising 0.5 to 20 vol % of a silicon precursor gas at a temperature from 400 to 700° C.

* * * * *